United States Patent
Gaudreau

(10) Patent No.: US 12,395,620 B2
(45) Date of Patent: Aug. 19, 2025

(54) METHOD AND DISPLAY SYSTEM FOR SHOWING A STEREOSCOPIC IMAGE

(71) Applicants: AYE3D INC., Montreal (CA); Jean-Etienne Gaudreau, Longueuil (CA)

(72) Inventor: Jean-Etienne Gaudreau, Longueuil (CA)

(*) Notice: Subject to any disclaimer, the term of this patent is extended or adjusted under 35 U.S.C. 154(b) by 0 days.

(21) Appl. No.: 17/787,057

(22) PCT Filed: Dec. 15, 2020

(86) PCT No.: PCT/CA2020/051722
§ 371 (c)(1),
(2) Date: Jun. 17, 2022

(87) PCT Pub. No.: WO2021/119807
PCT Pub. Date: Jun. 24, 2021

(65) Prior Publication Data
US 2023/0051252 A1 Feb. 16, 2023

Related U.S. Application Data

(60) Provisional application No. 62/950,298, filed on Dec. 19, 2019.

(51) Int. Cl.
| | | |
|---|---|---|
| *H04N 13/383* | (2018.01) | |
| *H04N 13/305* | (2018.01) | |
| *H04N 13/32* | (2018.01) | |

(52) U.S. Cl.
CPC ......... *H04N 13/383* (2018.05); *H04N 13/305* (2018.05); *H04N 13/32* (2018.05)

(58) Field of Classification Search
CPC .... H04N 13/305; H04N 13/32; H04N 13/366; H04N 13/383

(Continued)

(56) References Cited

U.S. PATENT DOCUMENTS

| | | |
|---|---|---|
| 5,457,574 A | 10/1995 | Eichenlaub |
| 5,959,664 A | 9/1999 | Woodgate |

(Continued)

FOREIGN PATENT DOCUMENTS

| | | | | |
|---|---|---|---|---|
| CN | 1476729 A | * | 2/2004 | ........... H04N 13/111 |
| CN | 1476730 A | * | 2/2004 | ........... H04N 13/305 |

(Continued)

OTHER PUBLICATIONS

International Search Report of International Application No. PCT/CA2020/051722, Search Completed on Mar. 2, 2021, Authorized Officer: Tung Nguyen.

(Continued)

*Primary Examiner* — Behrooz M Senfi
(74) *Attorney, Agent, or Firm* — BCF LLP

(57) ABSTRACT

A display system comprises an image source generating left and right components of a stereoscopic image, a screen adapted to display the left and right image components, a light source emitting parallel light strips, a lenticular panel having parallel lenses for directing light from the light source toward the screen, and a tracking system of a position of a viewer. A controller receives the position of the viewer, in a first timeslot causes the image source to generate the left component of the stereoscopic image while controlling lighting of some light strips directed by the lenticular panel through the screen and toward the left eye of the viewer and, in a second timeslot causes the image source to generate the right component of the stereoscopic image while controlling lighting of other light strips directed by the lenticular panel through the screen and toward the right eye of the viewer.

24 Claims, 24 Drawing Sheets

(58) Field of Classification Search
USPC .......................................................... 348/51
See application file for complete search history.

(56) References Cited

U.S. PATENT DOCUMENTS

| | | | |
|---|---|---|---|
| 6,163,336 | A | 12/2000 | Richards |
| 6,473,115 | B1 | 10/2002 | Harman |
| 6,593,957 | B1 | 7/2003 | Christie |
| 9,414,049 | B2 | 8/2016 | Gaudreau |
| 2002/0021832 | A1 | 2/2002 | Dawson |
| 2003/0025995 | A1 | 2/2003 | Redert |
| 2003/0048237 | A1 | 3/2003 | Sato |
| 2006/0227433 | A1* | 10/2006 | Suzuki ................. G03B 21/625 359/742 |
| 2007/0188667 | A1* | 8/2007 | Schwerdtner ........ H04N 13/305 348/E13.05 |
| 2010/0118129 | A1 | 5/2010 | Amroun |
| 2012/0224038 | A1 | 9/2012 | Roth |
| 2014/0071253 | A1* | 3/2014 | de la Barre .......... H04N 13/324 348/51 |
| 2014/0320614 | A1* | 10/2014 | Gaudreau ............ H04N 13/366 348/51 |
| 2015/0268479 | A1* | 9/2015 | Woodgate .............. G02B 30/31 359/462 |
| 2018/0310907 | A1* | 11/2018 | Zhang .................. G06F 3/0346 |
| 2019/0166359 | A1* | 5/2019 | Lapstun ............... H04N 13/307 |

FOREIGN PATENT DOCUMENTS

| | | | | |
|---|---|---|---|---|
| CN | 101491109 | A | 7/2009 | |
| CN | 102466905 | A * | 5/2012 | ............. G02B 27/26 |
| CN | 112352422 | A * | 2/2021 | ............. B60K 35/00 |
| EP | 0902316 | A2 * | 3/1999 | ............. G03B 21/62 |
| EP | 1415482 | A1 | 5/2004 | |
| EP | 1698914 | A1 * | 9/2006 | ............ G02B 3/0031 |
| EP | 1703743 | A1 * | 9/2006 | ............ H04N 13/312 |
| EP | 2628303 | A1 | 8/2013 | |
| JP | 2005092363 | A * | 4/2005 | ............... G06T 3/00 |
| JP | 2007518113 | A | 4/2010 | |
| JP | 2014153705 | A | 1/2018 | |
| WO | 2017114839 | A1 | 7/2017 | |

OTHER PUBLICATIONS

First Office Action issued on Dec. 6, 2023 by the China National Intellectual Property Administration (CNIPA) in connection with Chinese patent application No. 202080096850.X, 11 pages.
European Search Report issued on Nov. 11, 2023 by the European Patent Office (EPO) in connection with European patent application No. 20902512.1, 9 pages.
Rejection Decision issued by CNIPA on Dec. 21, 2024 in connection with Chinese patent application No. 202080096850.X, 14 pages.
First Office Action issued by the Taiwanese Intellectual Property Office on Aug. 6, 2024 in connection with Taiwanese patent application No. 109144862, 9 pages.
Second Office Action issued by the China National Intellectual Property Administration (CNIPA) on Aug. 31, 2024 in connection with Chinese patent application No. 202080096850.X, 12 pages.
Office Action issued by the European Patent Office on Jan. 28, 2025 in connection with European patent application No. 20902512.1, 6 pages.
Office Action issued by the Japanese Patent Office on Feb. 4, 2025 in connection with Japanese patent application No. 2022-538416, 5 pages.

* cited by examiner

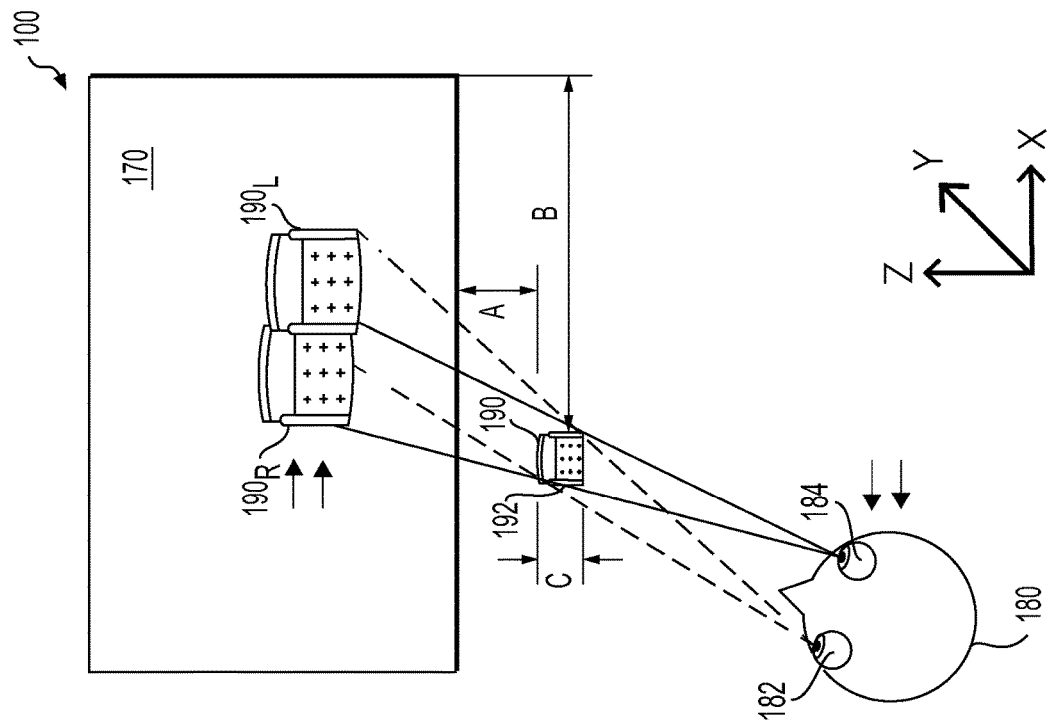
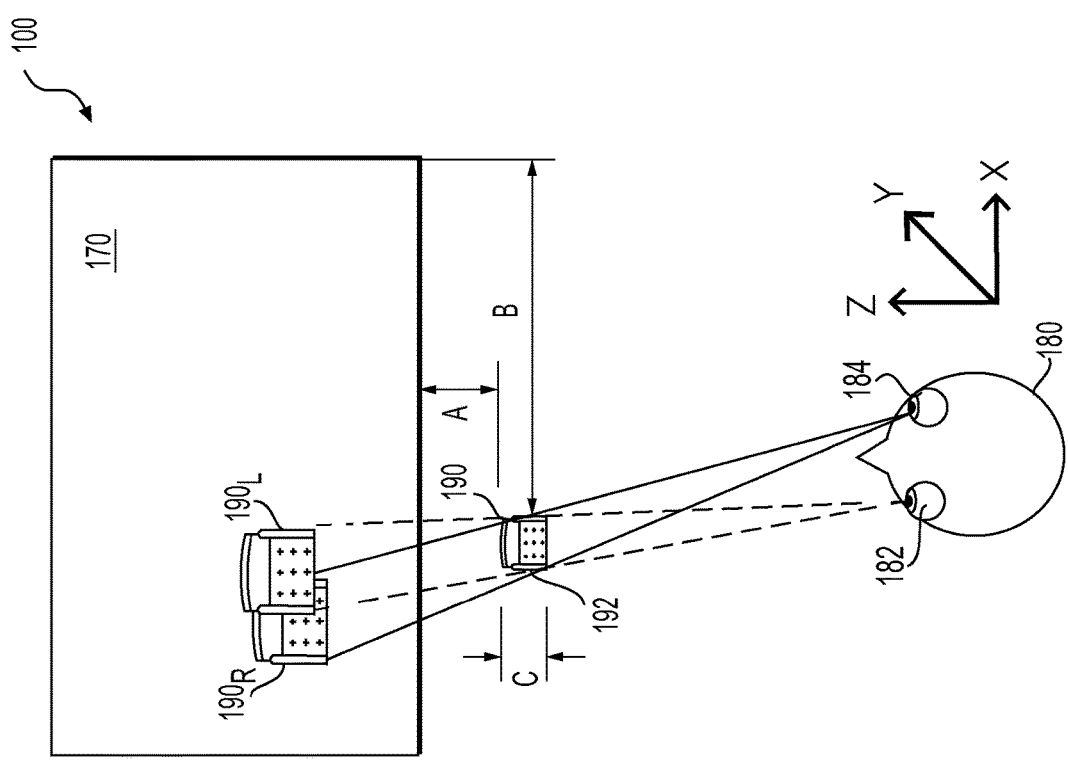

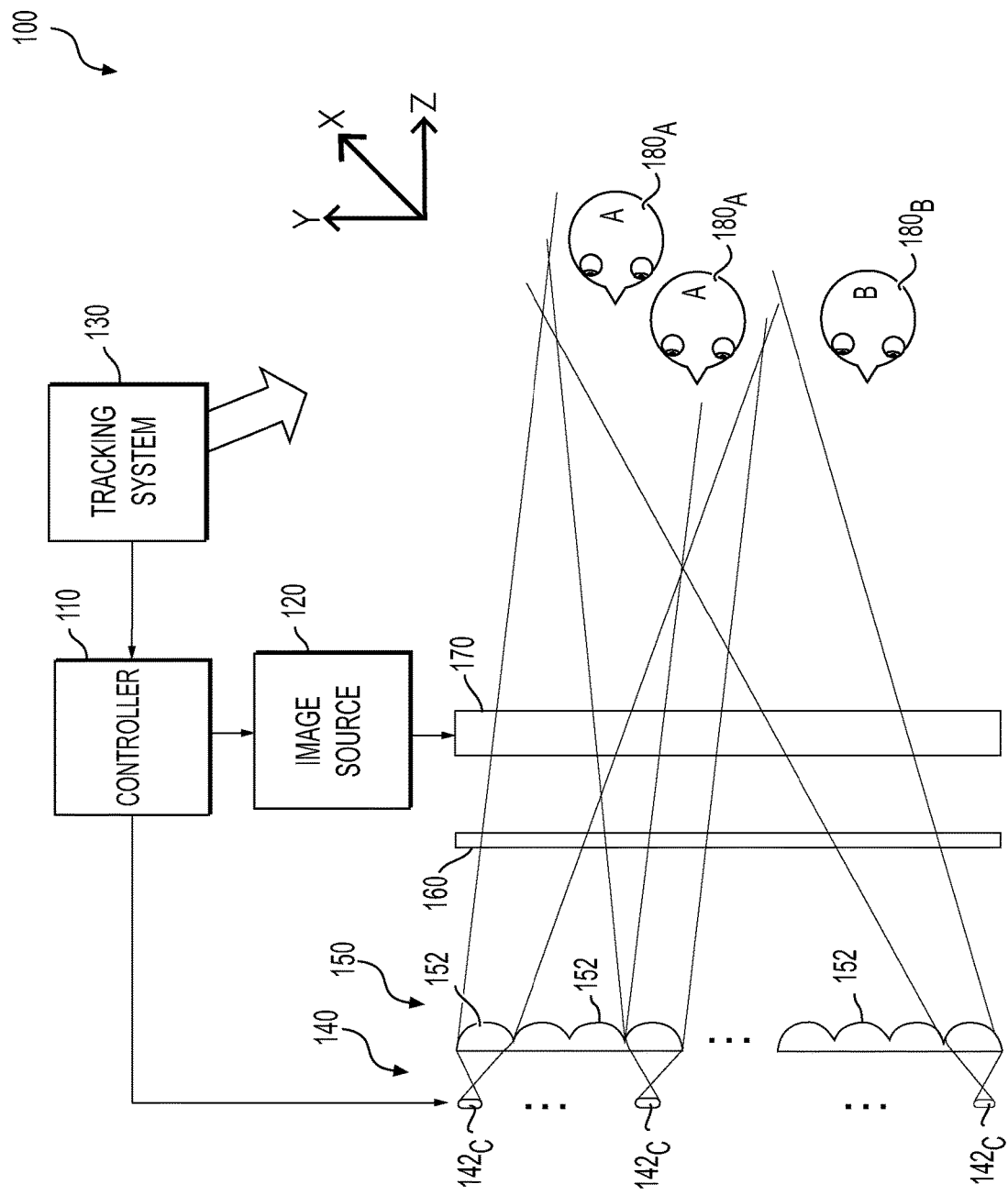

METHOD AND DISPLAY SYSTEM FOR SHOWING A STEREOSCOPIC IMAGE

CROSS-REFERENCE

The present application claims priority from U.S. Provisional Patent Application No. 62/950,298, filed on Dec. 19, 2019, the disclosure of which is incorporated by reference herein in its entirety.

TECHNICAL FIELD

The present disclosure relates to the field of electronic video equipment. More specifically, the present disclosure relates to a method and a display system for showing a three-dimensional image.

BACKGROUND

Stereoscopy refers to a technique for creating or enhancing the illusion of depth in an image by presenting two offset images separately to the left and right eye of a viewer. Stereoscopic visual displays, also called three-dimensional (3D) displays, are rapidly becoming ubiquitous.

These devices are commonly used for viewing 3D movies or for gaming applications. Use of stereoscopic technology may create more realistic games or scenery by providing depth to objects through presenting a unique view to each eye of a viewer. In polarization technology 3D TV, linear polarized and circularly polarized lights are used to separate two complementary images. Stereoscopic imaging therefore requires simultaneous showing of two complementary images, emitted at distinct polarizations. According to some 3D vision methods, left and right images are shown alternatively and viewers wear special glasses having distinct filters on the left and right sides, for example shutter glasses, to ensure that each eye perceives a distinct one of the complementary images.

Autostereoscopic displays do not require a viewer to wear specialized glasses to perceive stereoscopic images. Some autostereoscopic displays use head tracking systems or eye tracking systems to actively and adaptively deflect complementary images emitted from a screen toward a viewer's left and right eyes.

Conventionally, head tracking autostereoscopic displays offer only half, or less than half, of the available resolution and may rely either on mechanical lenticular displacement to steer vertical interlaced stereo images to each corresponding eyes or use a controllable barrier with a very small strip, which is a lot smaller than a pixel size. Moreover, complex electro-optical arrangements are required to support 3D and two-dimensional (2D) imaging on the same screen.

No conventional stereoscopic or autostereoscopic system provides a real perspective view, except when the viewer is in a predetermined position.

Therefore, there is a need for methods and devices for showing 3D images of good resolution without requiring the viewer to wear special glasses while also allowing a viewer freedom of movement while adapting the perspective of the 3D images according to the viewer position, creating a realistic view of an object or a scenery, in a way approaching a real-life viewer experience.

SUMMARY

In a first aspect, the present disclosure provides a display system for showing a stereoscopic image. The display system, comprises an image source adapted to generate left and right components of the stereoscopic image, a screen operatively connected to the image source and adapted to display the left and right components of the stereoscopic image, a light source adapted to selectively emit a plurality of parallel light strips, a lenticular panel having a plurality of parallel lenses, each given lens of the lenticular panel being configured to direct light from a given light strip of the light source toward the screen in a direction determined by relative positions of the given light strip and of the given lens, a tracking system adapted to track a position of a viewer, and a controller operatively connected to the image source, to the light source, and to the tracking system. The controller is configured to receive the position of the viewer from the tracking system, calculate positions of left and right eyes of the viewer based on the position of the viewer, in a first timeslot of a repeating succession of timeslots, (i) cause the image source to generate the left component of the stereoscopic image, and (ii) control lighting of a first group of light strips directed by the lenticular panel through the screen and toward the left eye of the viewer, and in a second timeslot of the repeating succession of timeslots, (i) cause the image source to generate the right component of the stereoscopic image, and (ii) control lighting of a second group of light strips directed by the lenticular panel through the screen and toward the right eye of the viewer.

In a second aspect, the present disclosure provides a display system for showing a stereoscopic image. The display system comprises an image source adapted to generate left and right components of the stereoscopic image, a screen operatively connected to the image source and adapted to display the left and right components of the stereoscopic image, a light source adapted to selectively emit a plurality of parallel light strips, a lenticular panel having a plurality of parallel lenses, each given lens of the lenticular panel being configured to direct light from a given light strip of the light source toward the screen in a direction determined by relative positions of the given light strip and of the given lens, a tracking system adapted to track positions of left and right eyes of a viewer, and a controller operatively connected to the image source, to the light source, and to the tracking system. The controller is configured to receive the positions of the left and right eyes of the viewer from the tracking system, in a first timeslot of a repeating succession of timeslots, (i) cause the image source to generate the left component of the stereoscopic image, and (ii) control lighting of a first group of light strips directed by the lenticular panel through the screen and toward the left eye of the viewer, and in a second timeslot of the repeating succession of timeslots, (i) cause the image source to generate the right component of the stereoscopic image, and (ii) control lighting of a second group of light strips directed by the lenticular panel through the screen and toward the right eye of the viewer.

In a third aspect, the present disclosure provides a method for showing a stereoscopic image. The method comprises tracking positions of left and right eyes of a viewer. The method also comprises, in a first timeslot of a repeating succession of timeslots, showing a left component of the stereoscopic image on a screen, and using a light source to illuminate the screen with a first group of light strips directed toward the left eye of the viewer. The method further comprises, in a second timeslot of the repeating succession of timeslots, showing a right component of the stereoscopic image on the screen, and using the light source to illuminate the screen with a second group of light strips directed toward the right eye of the viewer.

In a fourth aspect, the present disclosure provides a method for showing stereoscopic images to a plurality of viewers. The method comprises defining a repeating succession of non-overlapping timeslots, comprising a number of first timeslots corresponding to a number of the viewers and a number of second timeslots corresponding to the number of the viewers. The method also comprises tracking positions of left and right eyes of each of the plurality of viewers and, for each given viewer, allocating a specific first timeslot and a specific second timeslot, the specific first and second timeslots being reserved for the given viewer. The method further comprises, in the specific first timeslot, showing on a screen a left component of a specific stereoscopic image for the given viewer, and using a light source to illuminate the screen with a specific first group of light strips directed toward the left eye of the given viewer and, in the specific second timeslot, showing on the screen a right component of the specific stereoscopic image for the given viewer, and using the light source to illuminate the screen with a specific second group of light strips directed toward the right eye of the given viewer.

In a fifth aspect, the present disclosure provides a display system for showing images to at least two viewers. The display system comprises an image source adapted to generate a first image for a first viewer or a first group of viewers and a second image for a second viewer or a second group of viewers, a screen operatively connected to the image source and adapted to display the first and second images, a light source adapted to selectively emit a plurality of parallel light strips, a lenticular panel having a plurality of parallel lenses, each given lens of the lenticular panel being configured to direct light from a given light strip of the light source toward the screen in a direction determined by relative positions of the given light strip and of the given lens, a tracking system adapted to track a position of the first viewer or a position of the first group of viewers and to track a position of the second viewer or a position of the second group of viewers, and a controller operatively connected to the image source, to the light source, and to the tracking system. The controller is configured to receive the position of the first viewer or the position of the first group of viewers from the tracking system, in a first timeslot of a repeating succession of timeslots, (i) cause the image source to generate the first image, and (ii) control lighting of a first group of light strips directed by the lenticular panel through the screen and toward the position of the first viewer or toward the position of the first group of viewers, receive the position of the second viewer or the position of the second group of viewers from the tracking system, and in a second timeslot of the repeating succession of timeslots, (i) cause the image source to generate the second image, and (ii) control lighting of a second group of light strips directed by the lenticular panel through the screen and toward the position of the second viewer or toward the position of the second group of viewers.

In a sixth aspect, the present disclosure provides a display system for showing images to at least two viewers. The display system comprises an image source adapted to generate a monoscopic image for a first viewer or a first group of viewers and to generate a stereoscopic image for a second viewer, a screen operatively connected to the first and second image sources and adapted to display the monoscopic image and the stereoscopic image, a light source adapted to selectively emit a plurality of parallel light strips, a lenticular panel having a plurality of parallel lenses, each given lens of the lenticular panel being configured to direct light from a given light strip of the light source toward the screen in a direction determined by relative positions of the given light strip and of the given lens, a tracking system adapted to track a position of the first viewer or a position of the first group of viewers and to track positions of left and right eyes of the second viewer, and a controller operatively connected to the image source, to the light source, and to the tracking system. The controller is configured to receive the position of the first viewer or the position of the first group of viewers from the tracking system, in a first timeslot of a repeating succession of timeslots, (i) cause the image source to generate the monoscopic image, and (ii) control lighting of a first group of light strips directed by the lenticular panel through the screen and toward the position of the first viewer or toward the position of the first group of viewers, and receive the positions of the left and right eyes of the second viewer from the tracking system, in a second timeslot of the repeating succession of timeslots, (i) cause the image source to generate a left component of the stereoscopic second image, and (ii) control lighting of a second group of light strips directed by the lenticular panel through the screen and toward the position of the left eye of the second viewer, and in a third timeslot of the repeating succession of timeslots, (i) cause the image source to generate a right component of the stereoscopic second image, and (ii) control lighting of a second group of light strips directed by the lenticular panel through the screen and toward the position of the right eye of the second viewer.

In a seventh aspect, the present disclosure provides a method for concurrently showing different images to at least two viewers. A position of a first viewer or of a first group of viewers is tracked. A position of a second viewer or of a second group of viewers is also tracked. In a first timeslot of a repeating succession of timeslots, a first image is shown on a screen and a light source is used to illuminate the screen with a first group of light strips directed toward the position of the first viewer or of the first group of viewers. In a second timeslot of the repeating succession of timeslots, a second image is shown on the screen and the light source is used to illuminate the screen with a second group of light strips directed toward the position of the second viewer or of the second group of viewers.

In an eighth aspect, the present disclosure provides a method for concurrently showing a monoscopic image and a stereoscopic image. A position of a first viewer or of a first group of viewers is tracked. Positions of left and right eyes of a second viewer are also tracked. In a first timeslot of a repeating succession of timeslots, the monoscopic image is shown on a screen and a light source is used to illuminate the screen with a first group of light strips directed toward the position of the first viewer or of the first group of viewers. In a second timeslot of the repeating succession of timeslots, a left component of the stereoscopic image is shown on the screen and the light source is used to illuminate the screen with a second group of light strips directed toward the position of the left eye of the second viewer. In a third timeslot of the repeating succession of timeslots, a right component of the stereoscopic image is shown on the screen and the light source is used to illuminate the screen with a third group of light strips directed toward the position of the right eye of the second viewer.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which:

FIGS. 4a and 4b are schematic representations of the display system and the viewer of FIG. 1, also showing a perspective of a displayed image as a function of varying positions of the viewer;

FIG. 15 is a schematic top view of a display system showing one of two images to one of two groups of viewers in a first timeslot according to an embodiment;

Like numerals represent like features on the various drawings.

DETAILED DESCRIPTION

Various aspects of the present disclosure generally address one or more of the problems related to showing 3D images of good resolution on a display without requiring the viewer to wear special glasses while also allowing a viewer freedom of movement while adapting a perspective of the 3D images according to the viewer position.

Generally speaking, a display system shows, on a screen, a stereoscopic image in a series of consecutive timeslots. In this context, the term "screen" refers to the image producing component directly visible to the viewer. A left component of the stereoscopic image is shown on the screen in a first timeslot and a right component of the stereoscopic image is shown on the screen in a second timeslot, before showing again the left component of the stereoscopic image in a next instance of the first timeslot, and so on. The shown image may be a fixed image or a video with movement. A position of a viewer in front of the screen is tracked and positions of the left and right eyes of the viewer are determined. In the first timeslot, a group of directional light strips are lit behind the screen to direct light toward the left eye of the viewer. In the second timeslot, another group of directional light strips are lit behind the screen to direct light toward the right eye of the viewer. The two timeslots are continuously generated at a rapid pace, one after the other, so that each eye of the viewer perceives the corresponding left or right image components as if they were continuously displayed. For example, and without limitation, the two timeslots may be repeated at a frequency of 50 Hz or at a higher frequency. There is no need for the viewer to wear special glasses to perceive the stereoscopic image in three dimensions (3D). The viewer may move freely in front of the screen and the display system continuously adjusts the selection of the light strips as a function of the position of the viewer to maintain the viewer's 3D perception of the stereoscopic image.

It should be noted that, unless otherwise noted in the present description, the terms "first", "second", "third" and similar terms are meant to provide a distinction between similar entities, for example when relating to distinct timeslots, and are not meant to designate any specific order, priority or precedence between these entities.

Figure 1:
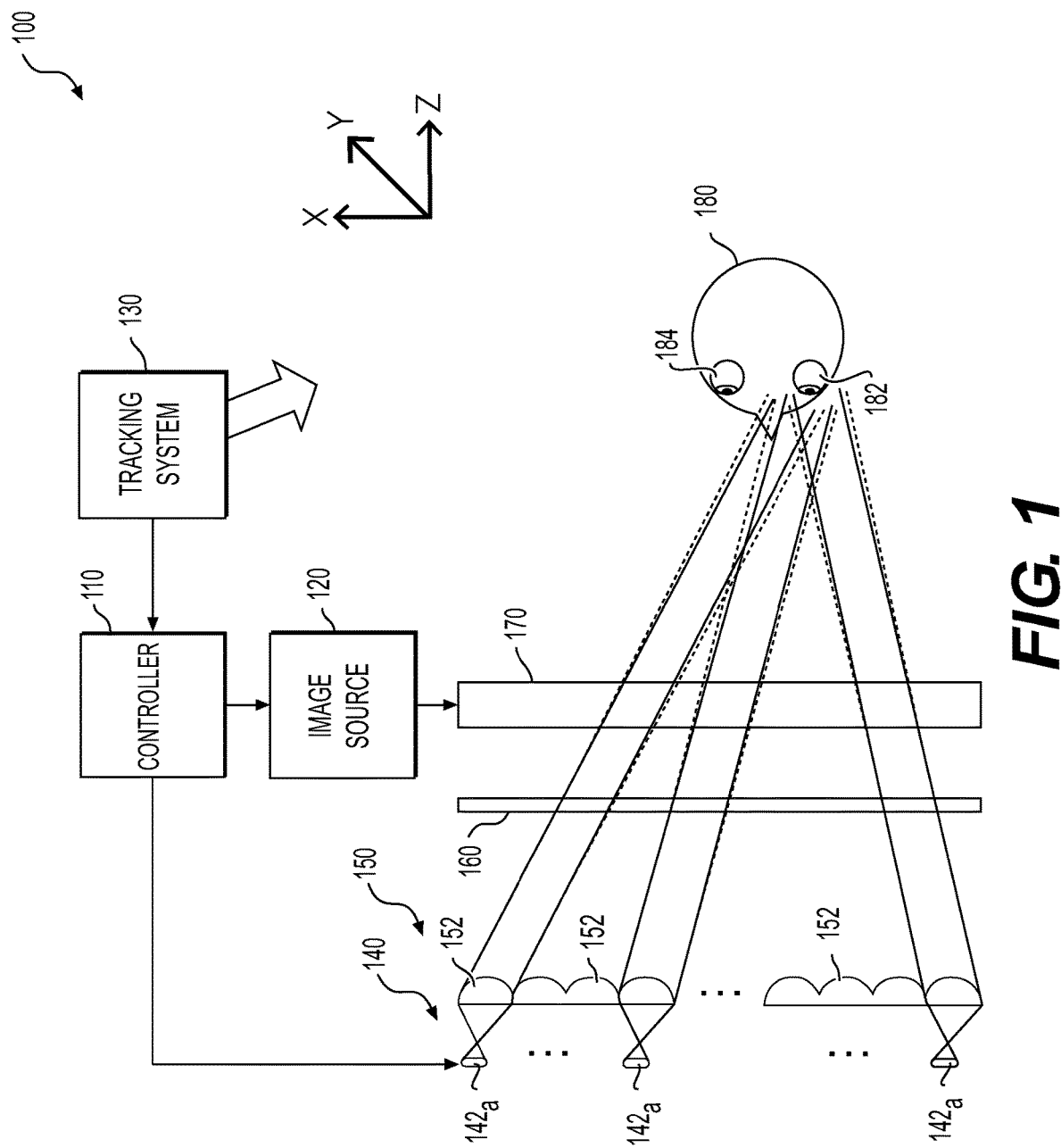
FIG. 1 is a schematic top view of a display system and a viewer, the display system showing a left-side image in a first timeslot according to an embodiment.
Figure 2:
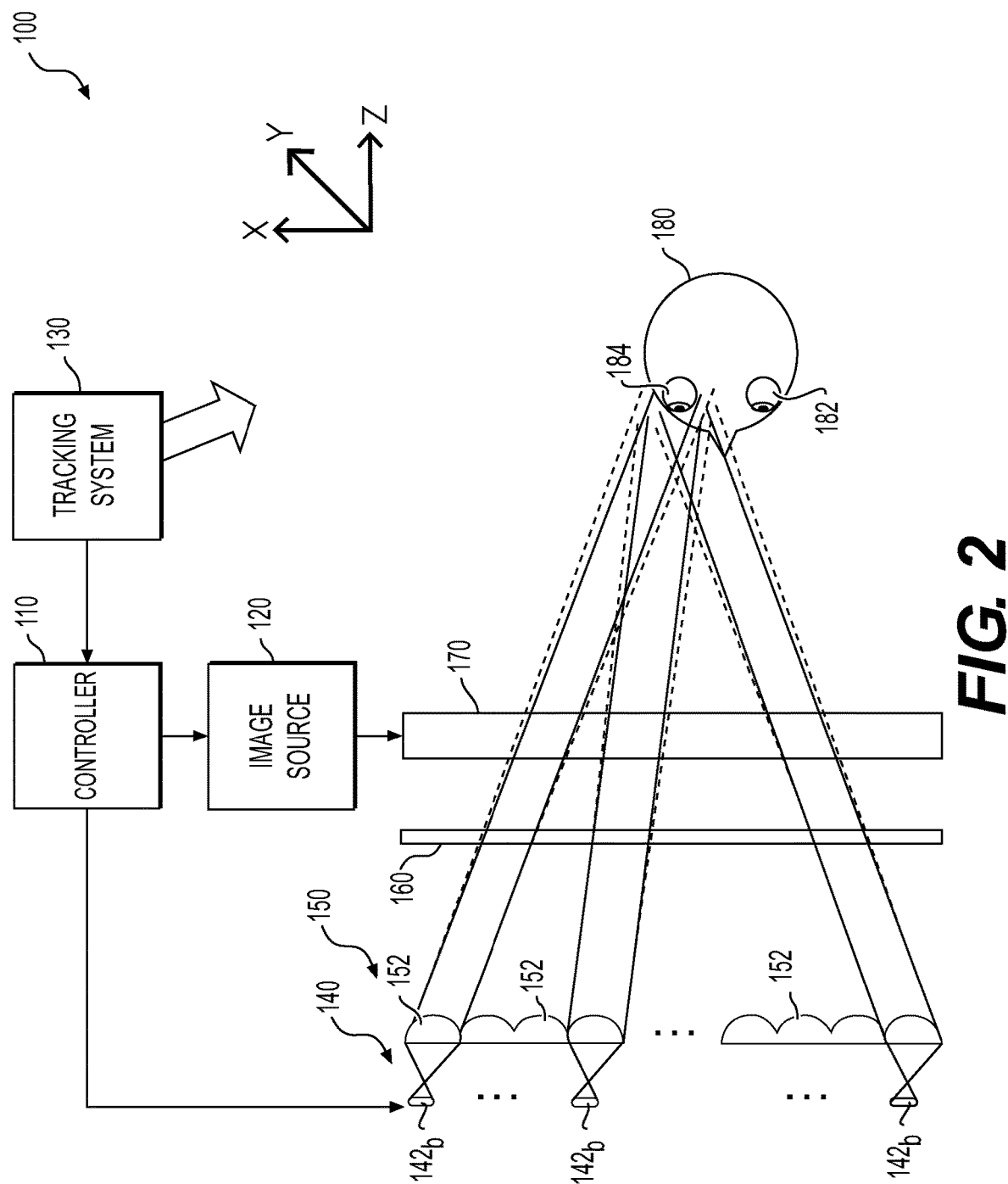
FIG. 2 is a schematic top view of the display system and the viewer of FIG. 1, the display system showing a right-side image in a second timeslot.
Figure 3:
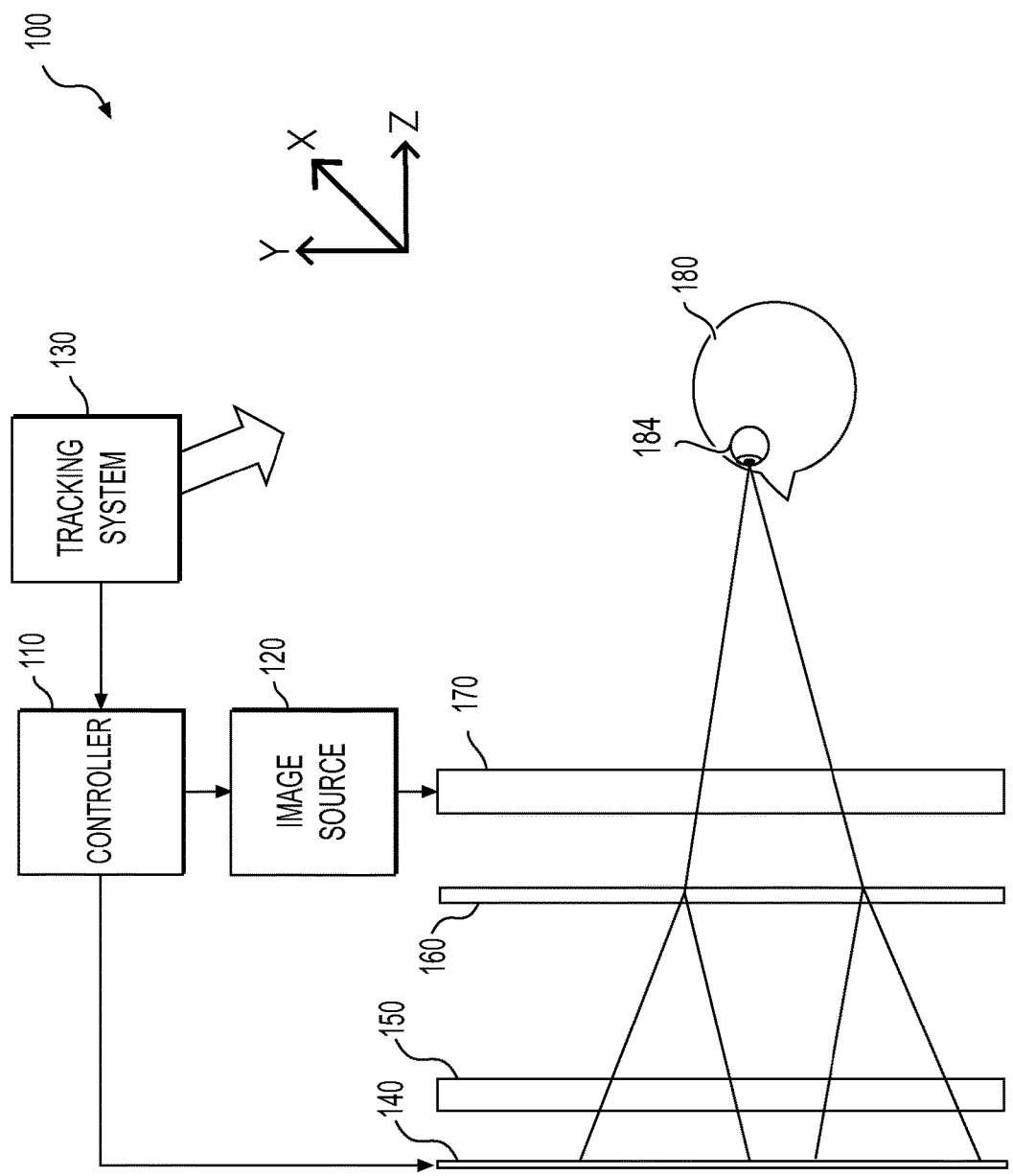
FIG. 3 is a schematic side elevation view of the display system and the viewer of FIG. 1.
Figure 7:
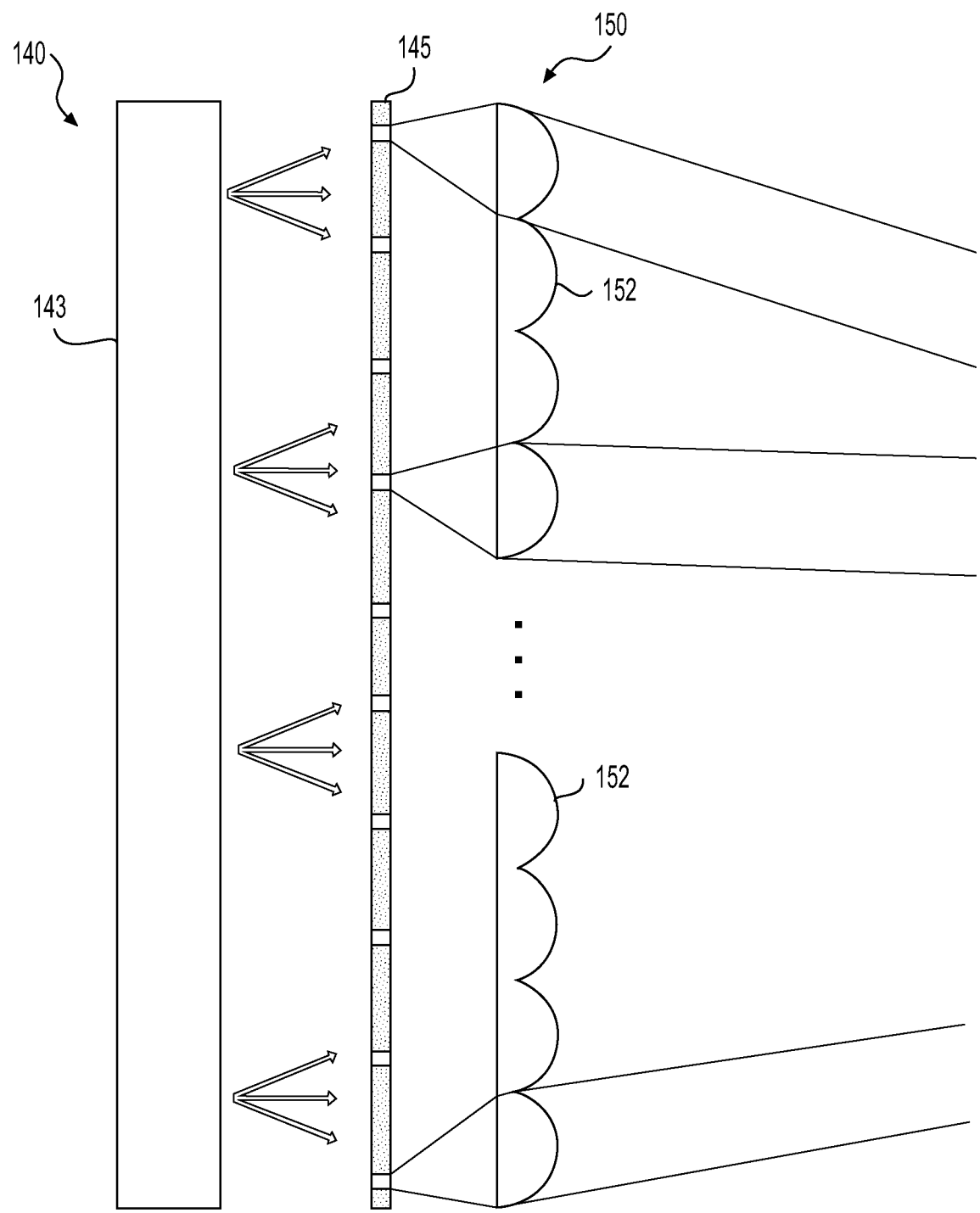
FIG. 7 is a schematic top view of a light source having a backlight and a valve matrix panel according to an embodiment.
Figure 8:
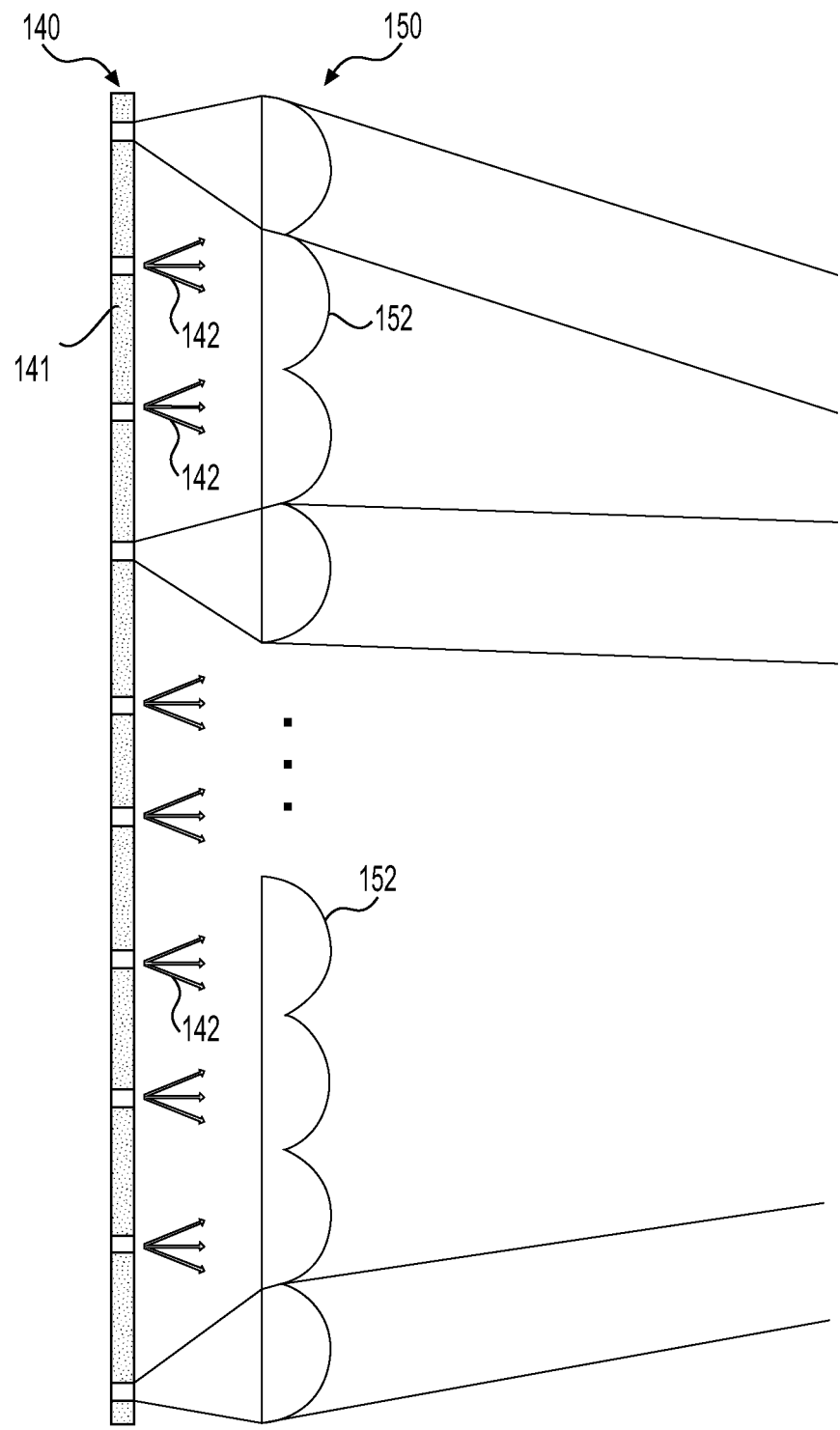
FIG. 8 is a schematic top view of a light source having a light generating matrix panel according to an embodiment.

Referring now to the drawings, FIG. 1 is a schematic top view of a display system and a viewer, the display system showing a left-side image in a first timeslot according to an embodiment. FIG. 2 is a schematic top view of the display system and the viewer of FIG. 1, the display system showing a right-side image in a second timeslot. FIG. 3 is a schematic side elevation view of the display system and the viewer of FIG. 1. A display system 100 for showing a stereoscopic image comprises a controller 110 connected to an image source 120 and to a tracking system 130. The controller 110 may be a processor, a computer, a combination of processors and/or computers, possibly including a memory, an interface, and similar components. The controller may be hard-wired for carrying functions of the display system 100 or may comprise programmable code for carrying these functions. The display system 100 further comprises a light source 140, a lenticular panel 150, which is a vertical array of lenses, a directional diffuser 160 and a screen 170. In the embodiment as shown, the lenticular panel 150 is positioned in front of the light source 140, the directional diffuser 160 is positioned in front of the lenticular panel 150, and the screen 170 is positioned in front of the directional diffuser 160. A viewer 180 may move in front of the screen 170 along any one of three axes. Various types of light sources 140 are contemplated. For example, FIG. 8 is a schematic top view of a light source having a light generating matrix panel according to an embodiment. The light source 140 is addressable and controllable by the controller 110 and may comprise a light generating matrix panel 141, for example and without limitation, an organic light-emitting diode (OLED) panel, a micro light emitting diode (micro-LED) panel, or may comprise a combination formed of a plurality of small light sources. Alternatively, as shown for example on FIG. 7, which is a schematic top view of a light source having a backlight and a valve matrix panel according to an embodiment, the light source 140 may comprise a uniform light source 143 and a valve matrix 145 addressable and controllable by the controller 110. In an embodiment, the valve matrix 145 may be implemented as liquid crystal display (LCD) panel for example. In an embodiment, the lenticular panel 150 may be axially rotated in relation to the LCD panel 145 in order to minimize a moiré pattern that could be caused by an interference between pixel arrangements of LCD panel 145 and of the LCD panel 170.

In the embodiments of FIGS. 1, 2, 3 and 8, a distance between the light source 140 and the lenticular panel 150 is set at a focal length of the lenses 152 of the lenticular panel 150, the focal length being a distance between the center each lens 152 and its focal point. As such, the light coming from the light source 140 is collimated by the lenses 152. Likewise in the embodiment of FIGS. 6 (introduced below) and 7, a distance between the valve matrix 145 and the lenticular panel 150 is set at a focal length of the lenses 152 of the lenticular panel 150 so that the light coming from the valve matrix 145 is collimated by the lenses 152. Although not shown on FIG. 6, it is contemplated that a half-wave retarder may be inserted at any position between the valve matrix 145 and the screen 170. The half-wave retarder may be used to modify by half a cycle a phase difference between the valve matrix 145 and the screen 170. Consequently, the half-wave retarder may allow to match a linear polarization direction of the valve matrix 145 with the linear polarization direction of the screen 170.

The light source 140 can selectively turn on and off a plurality of parallel light strips 142, groups 142$_a$ and 142$_b$ including a number of selected light strips 142 of the 140 light source being turned on and off according to control information received from the controller 110. Examples of the construction of the light source 140 are described hereinbelow. The lenticular panel 150 comprises a plurality of parallel lenses 152. As illustrated on FIGS. 1 and 2, the lenses 152 are plano-convex lenses. The lenticular panel 150 may comprise other types of lenses, as described hereinbelow. The directional diffuser 160 may be another lenticular panel, a panel including a plurality of lenses having a pseudo random focal length and/or a pseudo random width distribution, and/or a pseudo random angle/width prism array distribution. The screen 170 may for example be a liquid crystal display (LCD) screen, or any other screen adapted to display on its front side an image or a video provided by the image source 120 when the screen is illuminated from its rear side. A resolution of the screen 170 has no impact on the capability of the display system 100 to show stereoscopic images. Images displayed on the screen 170 in both of the first and second timeslots are displayed with the native resolution of the screen 170 provided in the display system 100. Without limitation, for enhanced image quality, the screen 170 may for example be a high-definition (HD) screen or a Quad HD (QHD) LCD screen having any size pixel definition.

For ease of illustration and without limiting the generality of the present disclosure, the various Figures show that the light strips 142 extend vertically and that the lenses 152 also generally extend vertically. Some devices, for example monitor or TV in digital signage, may be used in either landscape or portrait orientations. Mentions of the verticality of the light strips 142 are of the lenses 152 refer to a landscape orientation of the screen 170. No loss of generality of the present disclosure if the screen 170 is in a portrait orientation form factor.

In a non-limiting embodiment, the light source 140 may control 6000 light strips 142 and the lenticular panel 150 may be formed of 500 lenses 152. Each of the lenses 152 may thus receive light from 1 to 12 light strips 142 and redirect light through the directional diffuser 160 toward specific area of the screen 170. Different ratios between the number of light strips 142 of the light source 140 and the number of lenses 152 of the lenticular 150 are also contemplated; the above numbers of light strips 142 and of lenses 152 are for illustration purposes and are not intended to limit the present disclosure. The light from any given light strip 142 may be redirected by distinct lenses 152 toward distinct areas of the screen 170.

The tracking system 130 may track the head or the face of the viewer 180 provide information to the controller 110 about the current position of the viewer 180 in front of the screen 170. The controller 110 may use the current position of the viewer 180 to estimate positions of the left and right eyes 182, 184 of the viewer 180. Alternatively, the information provided by the tracking system 130 may actually include respective positions of the left and right eyes 182, 184 of the viewer 180. In an embodiment, the tracking system 130 may track positions of the eyes (e.g. track positions of the pupils) of the viewer 180. Considering FIG. 1, at a first timeslot, a first group 142$_a$ of light strips 142 is lit while the controller 110 causes the image source 120 to generate the left component of the stereoscopic image to be shown on the screen 170. The controller 110 uses a map of relationships between relative positions of the parallel light strips 142 on the light source 140, of the lenses 152 to select the first group 142$_a$ of light strips 142 so that their light reaches the left eye 182 of the viewer after being directed by some of the lenses 152 and passing through the directional diffuser 160 to illuminate an area of the screen 170 showing pixels of the left component of the stereoscopic image. FIG. 2 shows that at a second timeslot, a second group 142$_b$ of light strips 142 is lit while the controller 110 causes the image source 120 to generate the right component of the stereoscopic image. The controller 110 uses the map of relationships to select the second group 142$_b$ of light strips 142 so that their light reaches the right eye 184 of the viewer after passing through some of the lenses 152 and through the directional diffuser 160 to illuminate another area the screen 170 showing pixels of the right component of the stereoscopic image.

In an embodiment, the tracking system 130, or two tracking systems 130, may track positions of two distinct viewers and report these positions to the controller 110. The display system 100 may cause the image source 120 to display a first image, for example a monoscopic image or video, in a first timeslot and control the light source 140 to select a first group of light strips 142 to illuminate the first image in a direction of a first viewer. The display system 100 may then cause the image source 120 to display a second image in a second timeslot and control the light source 140 to select a second group of light strips 142 to illuminate the second image in a direction of a second viewer. More timeslots may be used to display a plurality of images for the benefit of a plurality of viewers.

To allow two viewers to see two stereoscopic images, the controller may implement a third timeslot for showing a left component of a second stereoscopic image to the left eye of the second viewer and a fourth timeslot for showing a right component of the second stereoscopic image to the left eye of the second viewer. This second stereoscopic image may show to the second viewer a same content as that of a first stereoscopic image viewed by the first viewer, for example to allow collaborative work between the two viewers. The two stereoscopic images may alternatively be independent from one another.

In other embodiments, the tracking system 130, or a plurality of distinct tracking systems 130, may track positions of a plurality of distinct viewers and provide these positions to the controller 110. The controller 110 may define a repeating succession of non-overlapping first timeslots and second timeslots. One specific first timeslot and one specific second timeslot are allocated to each given viewer. For a given viewer, left and right components of a specific stereoscopic image are displayed on the screen 170 in the specific first and second timeslots for that given viewer.

The map of relationships may store all possible relative positions between the parallel light strips 142 and the lenses 152. Considering FIG. 1, light emitted by a rightmost light strip 142 may never reach a leftmost lens 152; if it did, the leftmost lens 152 would direct the light from the rightmost light strip 142 away from the screen 170. Consequently, the map of relationships may be arranged to only store those relative positions that may actually be used in the display system 100.

The selection of the groups 142$_a$ and 142$_b$ of light strips 142 may be made by the controller 110 as follows. In the first timeslot, for each given section of the left component of the stereoscopic image, the controller 110 determines a first direction between the left eye 182 of the viewer 180 and an area on the screen 170 where the given section of the left component of the stereoscopic image is to be shown. The controller 110 includes in the first group 142$_a$ of light strips 142 one or more light strips 142 that emit light in the first direction. In the second timeslot, for each given section of the right component of the stereoscopic image, the controller 110 determines a second direction between the right eye 184 of the viewer 180 and an area on the screen 170 where the given section of the right component of the stereoscopic image is to be shown. The controller 110 includes in the second group 142$_b$ of light strips 142 one or more light strips 142 that emit light in the second direction. In each of these first and second timeslots, the controller 110 may determine a direction of light emitted by each given light strip 142 of the light source 140 in view of a directional effect of each given lens 152 of the lenticular panel 150 directing light from the given light strip 142. Although FIGS. 1 and 2 show the first and second groups 142$_a$ and 142$_b$ as distinct groups of light strips 142, these groups 142$_a$ and 142$_b$ may actually overlap within the light source 140, depending on the position of the viewer 180 in front of the screen 170 and the determined first and second directions.

The viewer 180 may move horizontally about a width of the screen 170, along an X axis, and vertically about a height of the screen 170, about a Y axis. The viewer 180 may also move closer to the screen 170 or further away from the screen 170, along a Z axis. If the viewer 180 moves toward the left side of the screen 170, along the X axis, the controller 110 shifts the first and second groups 142$_a$ and 142$_b$ of light strips 142 toward the right side of the light source 140. The opposite is true when the viewer 180 moves toward the right side of the screen 170. If the viewer 180 moves away from the screen 170, along the Z axis, both the first and second groups 142$_a$ and 142$_b$ tend to include some of the light strips 142 that are more centrally located on the light source 140. The opposite is true when the viewer 180 moves closer to the screen 170.

Figure 5:
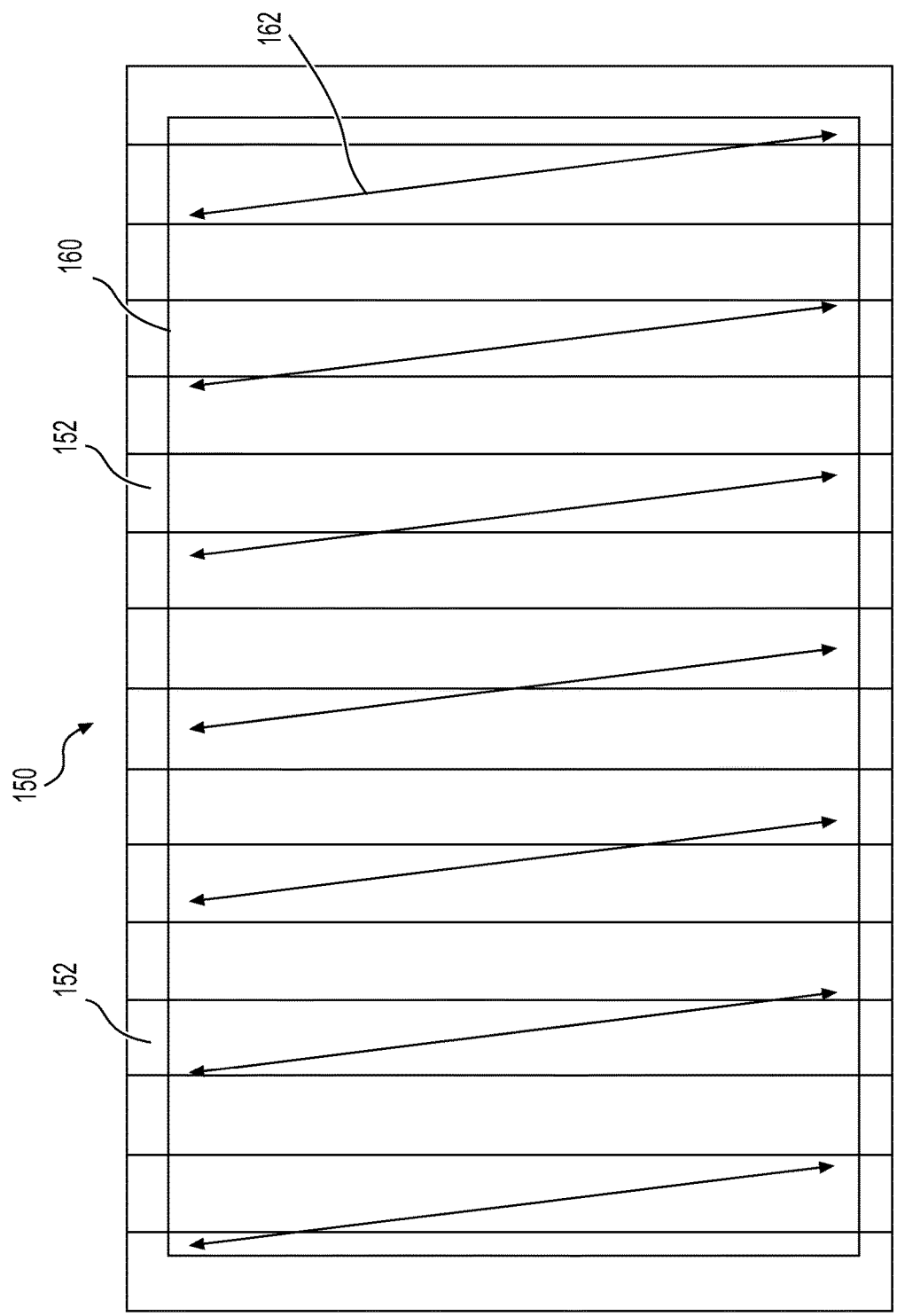
FIG. 5 is a schematic front elevation view of the display system of FIG. 1 showing an angle between a lenticular panel and a directional diffuser according to an embodiment.

As shown on FIG. 3, the directional diffuser 160 is positioned in a path of the light between the lenticular panel 150 and the screen 170. The directional diffuser 160 diffuses vertically the light emitted by the light source 140 through the lenticular panel 150. FIG. 5 is a schematic front elevation view of the display system of FIG. 1 showing an angle between a lenticular panel and a directional diffuser according to an embodiment. Although the light strips 142 of the light source 150 and the lenses 152 of the lenticular panel 150 are all generally vertical, there may be a very small angle between the light strips 142 and the lenses 150. As shown on FIG. 5, the directional diffuser 160 is rotated axially clockwise or counterclockwise, in relation to the lenticular panel 150 by a modest angle 162. The axial rotation of the directional diffuser 160 is useful in mixing and homogenizing the light directed by the lenticular panel 150 in view of hiding its pattern of lenses 152. The actual angle 162 between the directional diffuser 160 is selected based on a compromise between a desired directionality provided by a smaller angle 162 and a desired level of mixing provided by a larger angle 162. The controller 110 may slightly displace the light strips of the first and second groups 142$_a$ and 142$_b$ as the viewer 180 moves up or down along the Y axis, as a function of the actual angle 162 between the directional diffuser 160 and the lenticular panel 150.

FIGS. 4a and 4b are schematic representations of the display system and the viewer of FIG. 1, also showing a perspective of a displayed image as a function of varying positions of the viewer. The controller 110 calculates virtual camera positions based on the positions of the left and right eyes 182 and 184 of the viewer 180, using the position information provided by from the tracking system 110. The controller 110 forwards these virtual camera positions to the image source 120 that, in the embodiment of FIGS. 4a and 4b, includes a 3D rendering device. The virtual camera positions reflect the position of cameras that would be at the position currently held by the left and right eyes of the viewer 180. Examples of the 3D rendering devices that may be used include, without limitation, Unity™ from Unity Technologies, Unreal Engine™ from Epic Game, Inc., or a computer implementing a Solidworks™ computed assisted software from Dassault Systèmes SE. A 360-degree camera or any device suitable to generate still or moving 3D images with adjustable perspective may be used as the image source 120. On FIG. 4a, the viewer 180 is in a first position in front of the screen 170. A left view 190L of a virtual object 190 is generated by the image source 120 and displayed on the screen 170 in the first timeslot. A right view 190R of the object 190 is displayed on the screen 170 in the second timeslot. The object 190 is perceived as being in front of the screen 170 by the viewer 180. In more details, the object 190 appears to be at a distance A from the front of the screen 170 and at a distance B from a right edge of the screen 170, and appears to have a depth C.

On FIG. 4b, the viewer 180 has moved to his left to a second position in front of the screen 170, being now closer to the screen 170. Based on updated position information from the tracking system 130, the controller 110 calculates new virtual camera positions supplied to the image source 120. The left and right views 190L and 190R of the object 190 move to the right on the screen 170 and becomes larger. The viewer 180 still perceives the object 190 as being in front of the screen 170, at the distance A from the front of the screen 170 and at the distance B from a right edge of the screen 170. The object 190 still appears to have the depth C. The angle of view of the object 190 by the viewer 180 is changed so that a side 192 of the object 190, which was not visible when the viewer 180 was in the position as shown on FIG. 4a, is now visible to the viewer 180 in the position as shown on FIG. 4b.

Figure 6:
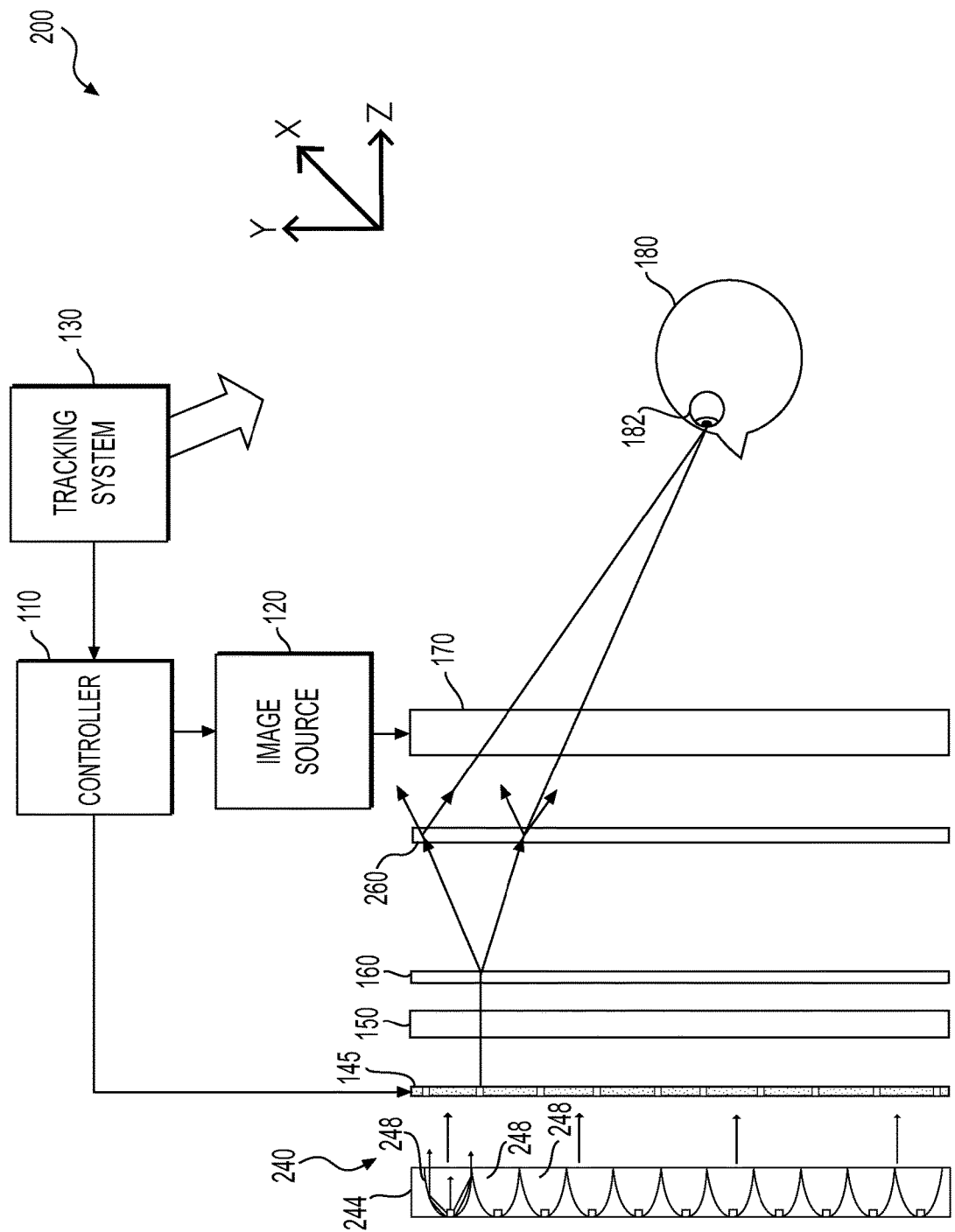
FIG. 6 is a schematic side elevation view of a display system having a vertically collimated backlight according to an embodiment.

FIG. 6 is a schematic side elevation view of a display system having a vertically collimated backlight according to an embodiment. A display system 200 comprises many of the same components as the display system 100, so only the distinct components will now be described. The light source 140 is replaced with a vertically collimated light source 240. The light source 240 comprises a collimated light source 244 and a controllable pixel matrix 145 that selectively passes or blocks light from the collimated light source 244 to form the light strips 142. The collimated light source 244 includes a plurality of parabolic lenses 248 that cause light from the collimated light source 244 to be vertically collimated. The directional diffuser 160 is moved closer to the lenticular panel 150 to diffuse the collimated light vertically. One directional diffuser 260 (or more additional directional diffusers, one is shown) is positioned near the screen 170 and provides an increased vertical dispersion and mixing of the light transmitted by the lenticular panel 150 and the directional diffuser 160. The directional diffuser 260 is oriented vertically along the Y axis, with a modest axial rotation in relation to the lenticular panel 150. The directional diffuser 260 mixes the vertically collimated light having passed through the directional diffuser 160. Use of the vertically collimated light source 244 thus narrows a horizontal spread of the emitted light, eliminating a diffusion of the light caused the angle between the lenses 152 and the directional diffuser 160. The light being collimated in the vertical direction, there is no longer any need to adjust the selection of the light strips 142 of the first and second groups $142_a$ and $142_b$ according to the vertical position of the viewer 180.

Figure 9:
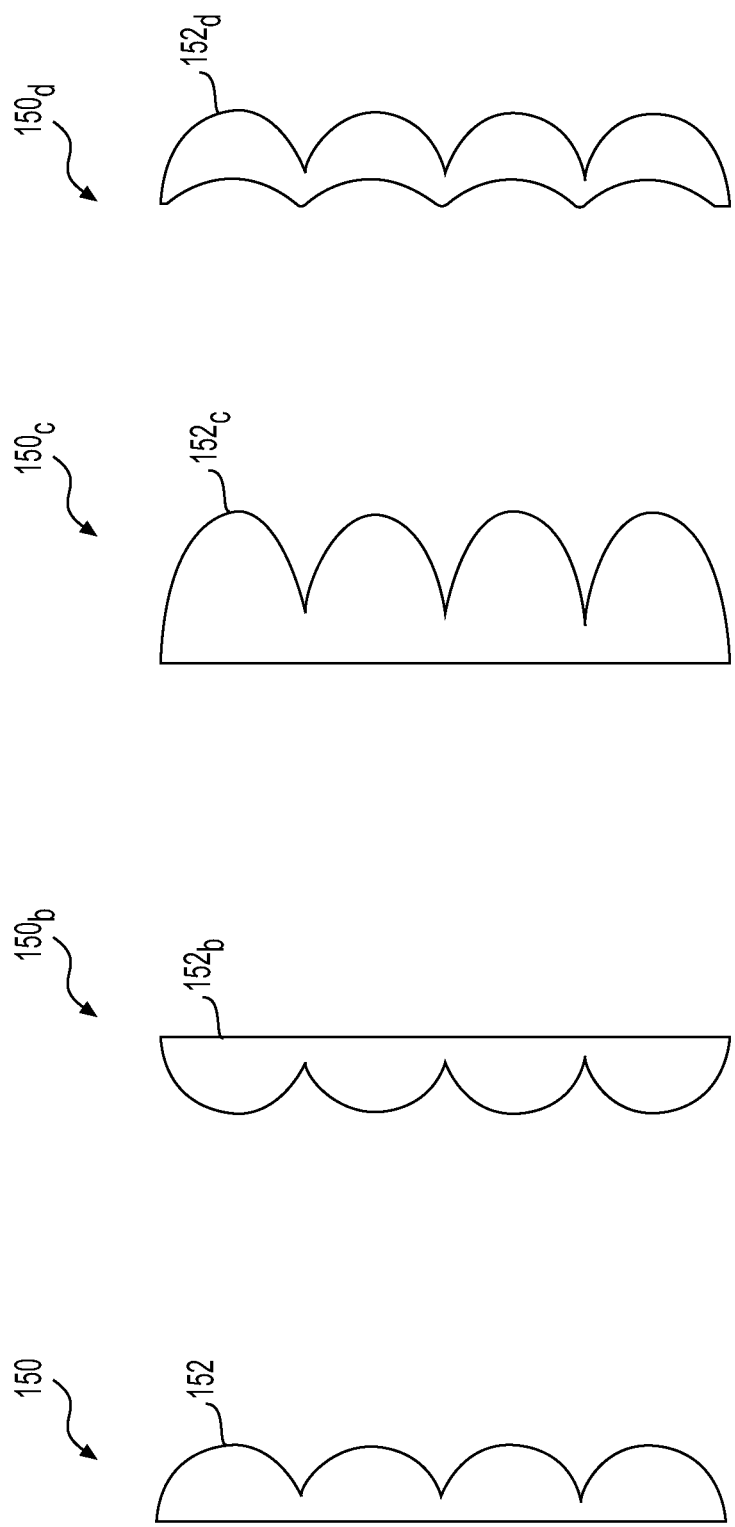
FIGS. 9a-9d are schematic top views of various lenticular configurations according to an embodiment.
Figure 10:
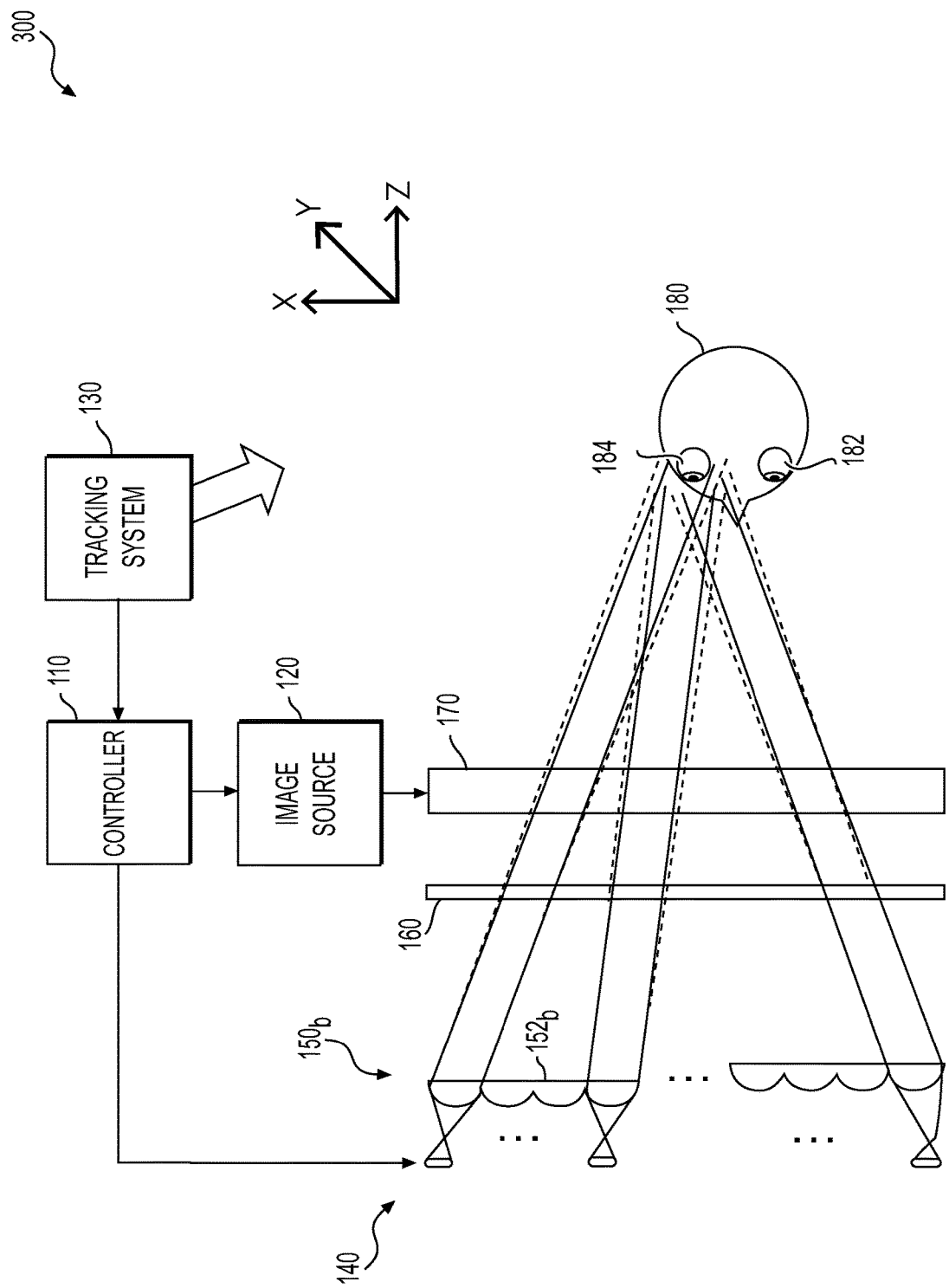
FIG. 10 is a schematic top view of a display system and a viewer, the display system having a plano-convex lenticular configuration according to an embodiment.

FIGS. 9a-9d are schematic top views of various lenticular configurations according to an embodiment. FIG. 10 is a schematic top view of a display system and a viewer, the display system having a plano-convex lenticular configuration according to an embodiment. FIG. 9a shows the lenticular panel 150 with the lenses 152 that have been introduced in the description of FIGS. 1, 2 and 3. The lenses 152 are plano-convex lenses. FIG. 9b shows a lenticular panel $150_b$ comprising convex-plano lenses $152_b$. FIG. 9c shows a lenticular panel $150_b$ comprising aspherical lenses $152_c$. FIG. 9d shows a lenticular panel $150_d$ comprising concave-convex lenses $152_d$. Use of the aspherical lenses $152_b$ may improve collimation of the light. Use of the concave-convex lenses $152_d$ may provide a constant focal length distance of the lenticular panel $150_d$. As shown on FIG. 10, a display system 300 differs from the display system 100 only in the use of the lenticular panel $150_b$ comprising convex-plano lenses $152_b$. Use of a lenticular panel including a combination of more than one of these types of lenses is also contemplated. The display system 300 functions in the same manner as the display system 100. The lenticular panels $150_b$ or $150_b$ or $150_d$ may also be integrated in the display system 200, according to the need of a particular application.

Figures 11A, 11B, 11C:
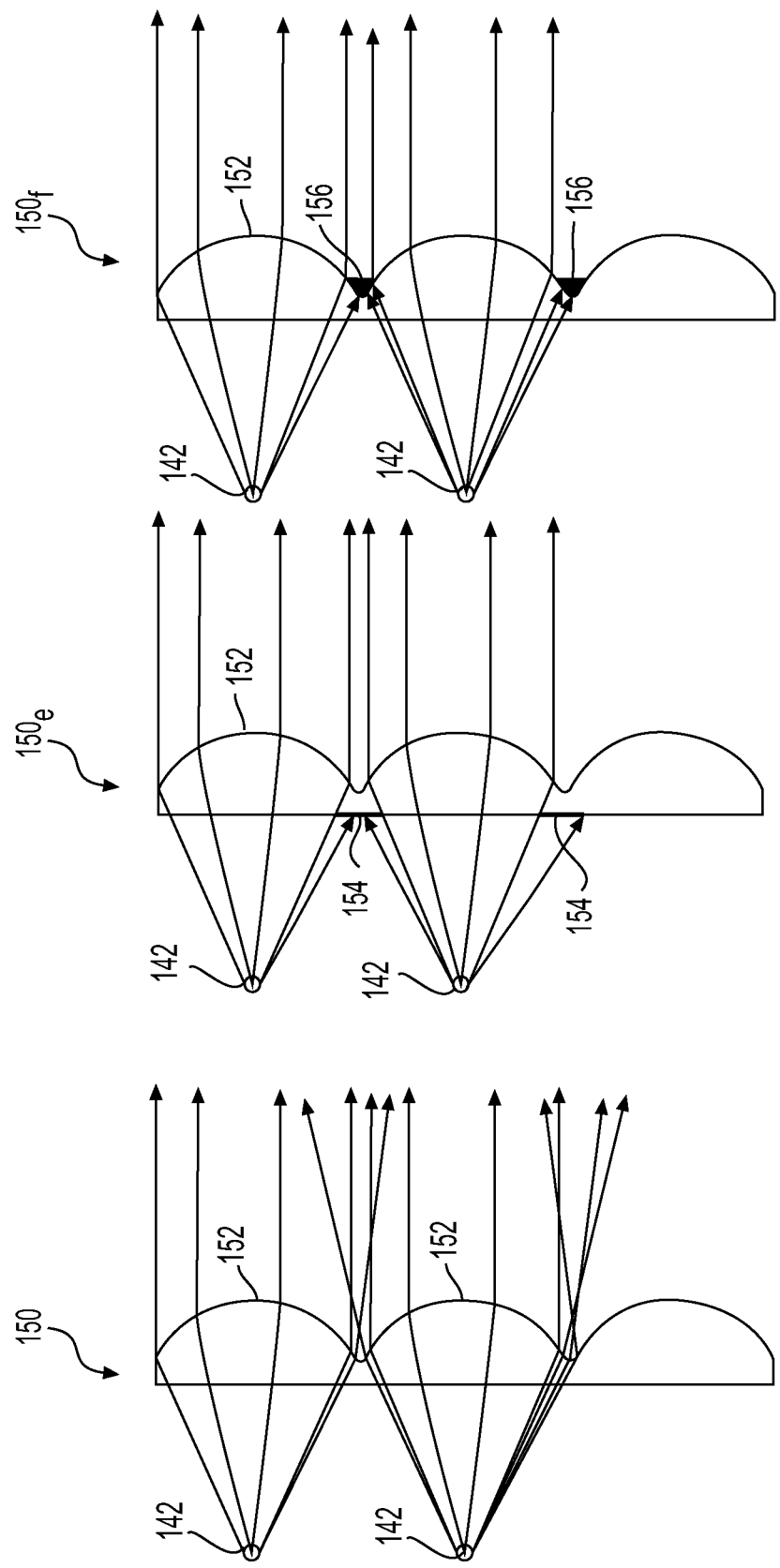
FIGS. 11a and 11b are schematic top views of plano-convex lenticular configurations, respectively without and with blackout strips according to an embodiment.
FIG. 11c is a schematic top view of a plano-convex lenticular configuration with inter-lens blackout fillers according to an embodiment.
Figure 12:
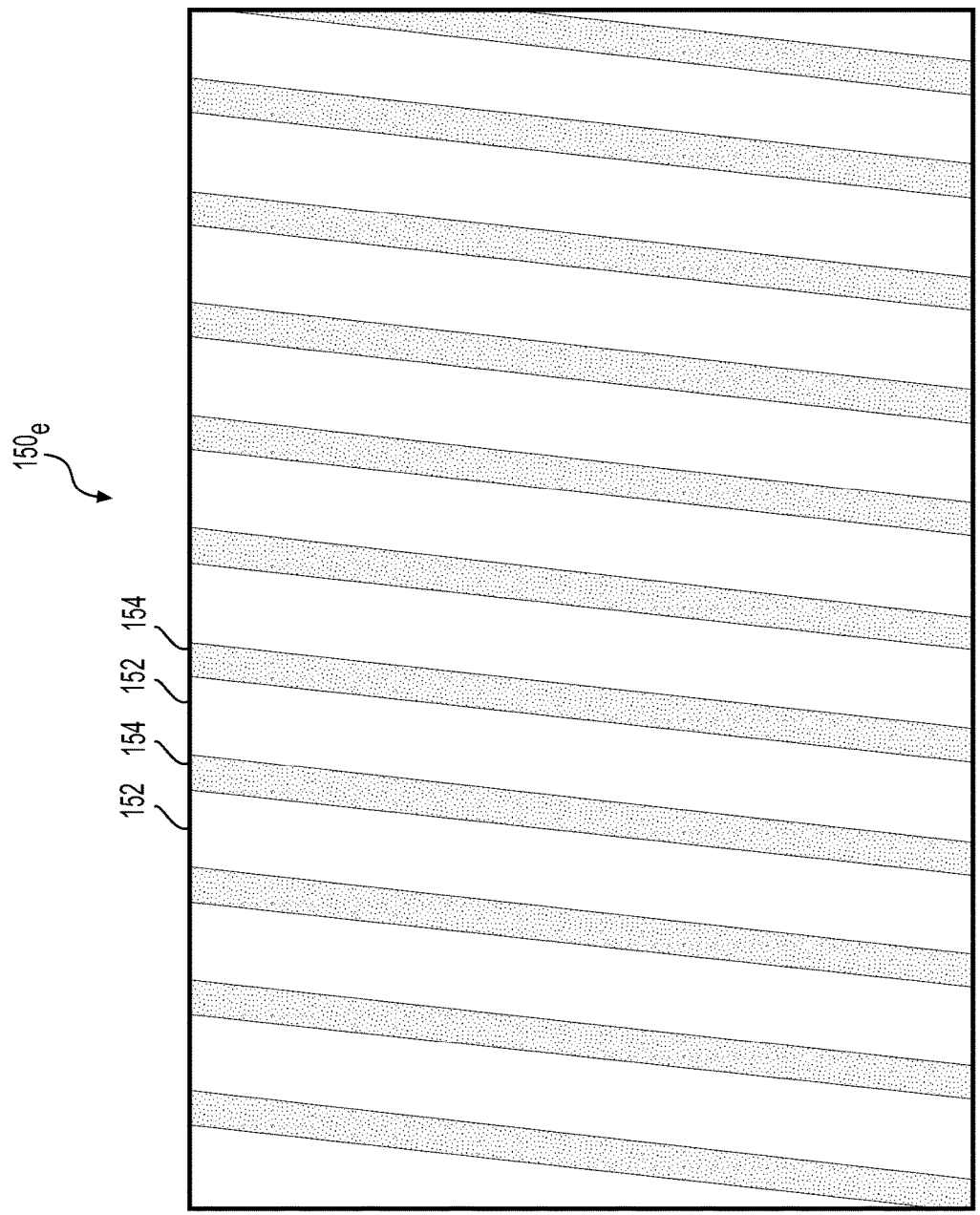
FIG. 12 is a schematic front elevation view of the plano-convex lens configuration with the blackout strips of FIG. 11b or with the inter-lens blackout fillers of FIG. 11c.

FIGS. 11a and 11b are schematic top views of plano-convex lenticular configurations, respectively without and with blackout strips according to an embodiment. FIG. 11c is a schematic top view of a plano-convex lenticular configuration with inter-lens blackout fillers according to an embodiment FIG. 12 is a schematic front elevation view of the plano-convex lens configuration with blackout strips of FIG. 11b or with the inter-lens blackout fillers of FIG. 11c. FIG. 11a shows the lenticular panel 150 with its lenses 152. FIG. 11b shows a modified lenticular $150_e$ having blackout strips 154 inserted between each pair of lenses 152 on a rear side of the modified lenticular $150_e$. FIG. 11c shows another modified lenticular $150_f$ having inter-lens blackout fillers 156 inserted on a front side of the modified lenticular $150_f$. These blackout strips 154 and inter-lens blackout fillers 156 tend to limit light scattering at each junction between pairs of lenses 152. Although FIGS. 11b and 11c respectively illustrate modified lenticulars that comprise the plano-convex lenses 152, the blackout strips 154 and/or the blackout fillers 156 may also be used in combination with the convex-plano lenses $152_b$ of FIG. 9b, the aspherical lenses $152_c$ of FIG. 9c, and/or the concave-convex lenses $152_d$ of FIG. 9d.

Figure 13:
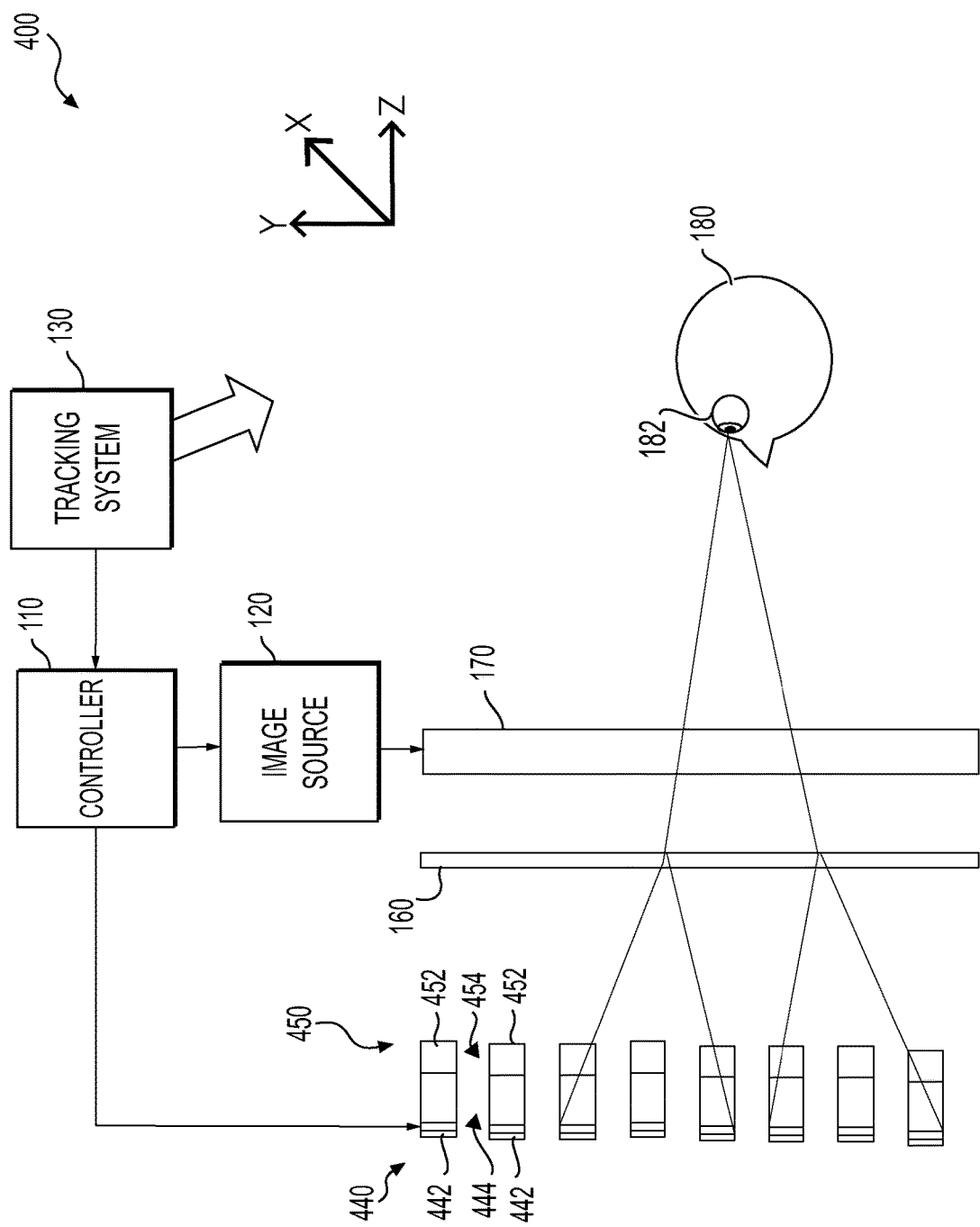
FIG. 13 is a schematic side elevation view of a display system and a viewer, the display system having a segmented backlight system according to an embodiment.
Figure 14:
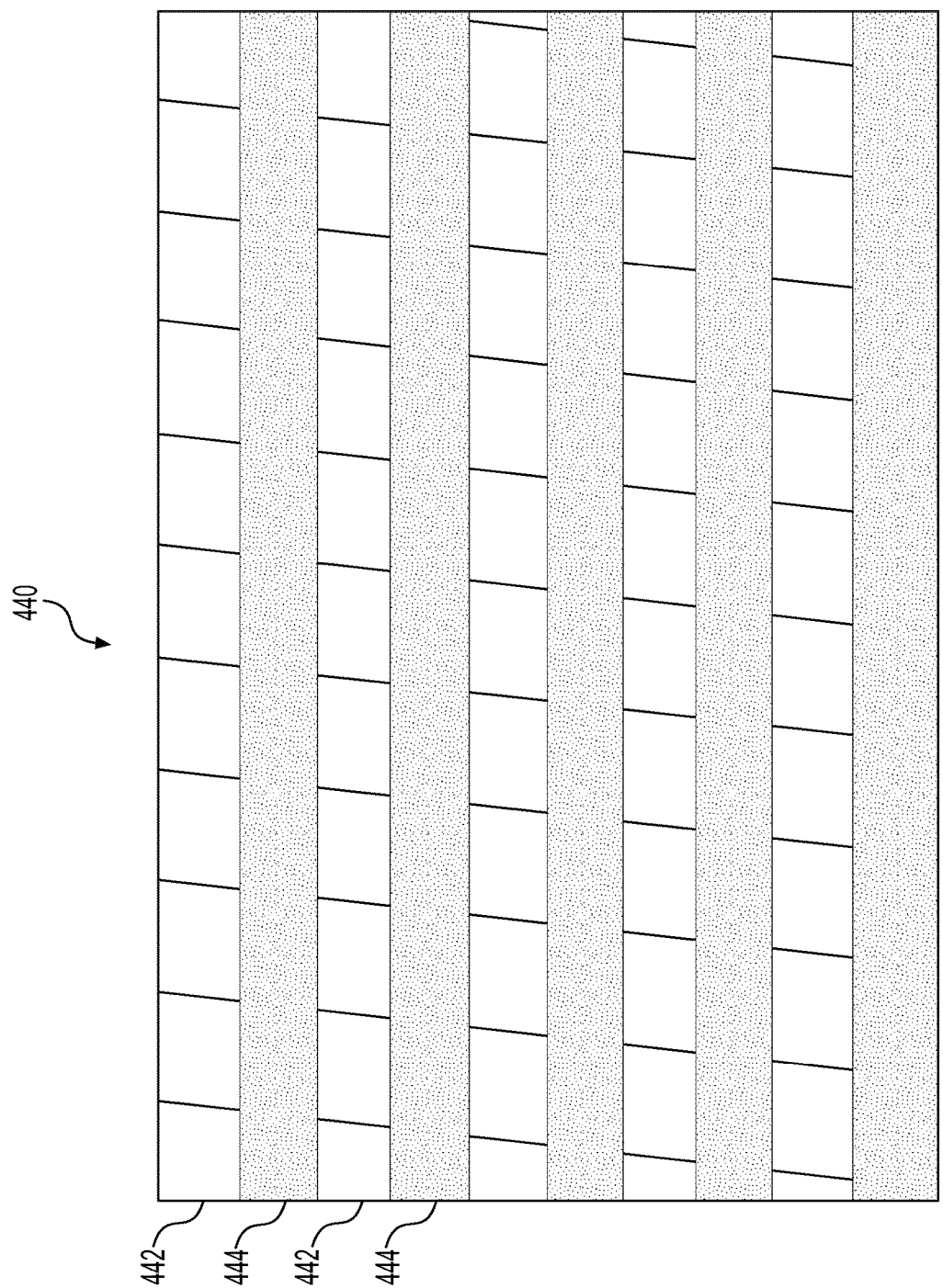
FIG. 14 is a schematic front elevation view of the segmented backlight system of FIG. 13.

FIG. 13 is a schematic side elevation view of a display system and a viewer, the display system having a segmented backlight system according to an embodiment. FIG. 14 is a schematic front elevation view of the segmented backlight system of FIG. 13. While the light sources 140 and 240 and the lenticular panel 150 introduced hereinabove form continuous panels extending vertically across a height of the display systems 100, 200 and 300, a display system 400 includes a light source 440 formed of a plurality of horizontal segments 442 separated by horizontal voids 444 and a lenticular panel 450 formed of another plurality of horizontal segments 452 corresponding to the segments 442 of the light source 440, the horizontal segments 452 being separated by horizontal voids 454 corresponding to the horizontal voids 444 of the light source 442. When considered along the width of the display system 400, each horizontal segment 442 of the light source 440 may include the features of any of the previously described light sources. Likewise, when considered along the width of the display system 400, each horizontal segment 452 of the lenticular panel 450 may include the features of any of the previously described lenticular panels. In the display system 400, the directional diffuser 160 may be configured to homogenize the light emitted by the light source 440 and directed by the lenticular panel 450 so that the viewer 180 may not perceive any effect from the gaps 442 and 452.

FIG. 15 is a schematic top view of a display system showing one of two images to one of two groups of viewers in a first timeslot according to an embodiment. The display system 100 introduced in the description of FIGS. 1, 2 and 3 may be used to display distinct images to distinct viewers. One of more viewers are assembled in each of two or more distinct viewer groups and the display system 100 generates a distinct image for each of the distinct viewer groups. There is no a priori limitation to the number of distinct viewer groups. FIG. 15 illustrates a simple use case involving two distinct images being displayed to two distinct groups.

FIG. 15 shows a first group of viewers $180_A$ and a second group of viewers $180_B$ (only one viewer $180_B$ is shown for simplicity of the illustration). The tracking system 130 tracks a position of at least one viewer of the first group of viewers $180_A$ and a position of at least one viewer of the second group of viewers $180_B$. The tracking system 130 provides these positions to the controller 110. In a first timeslot, the controller 110 causes the image source 120 to generate an image intended for the first group of viewers $180_A$. Also in the first timeslot, the controller 110 controls the light source 140 to turn on a first group $142_c$ of light strips that are selected so that their light reaches a general position of the first group of viewers $180_A$. Then, in a second timeslot, the controller 110 controls the light source 140 to turn on a second group (not shown) of light strips that are selected so that their light reaches the second group of viewers $180_B$. The display system 100 may thus display distinct images (including videos) for showing to distinct users or to distinct groups of users.

Figure 16A:
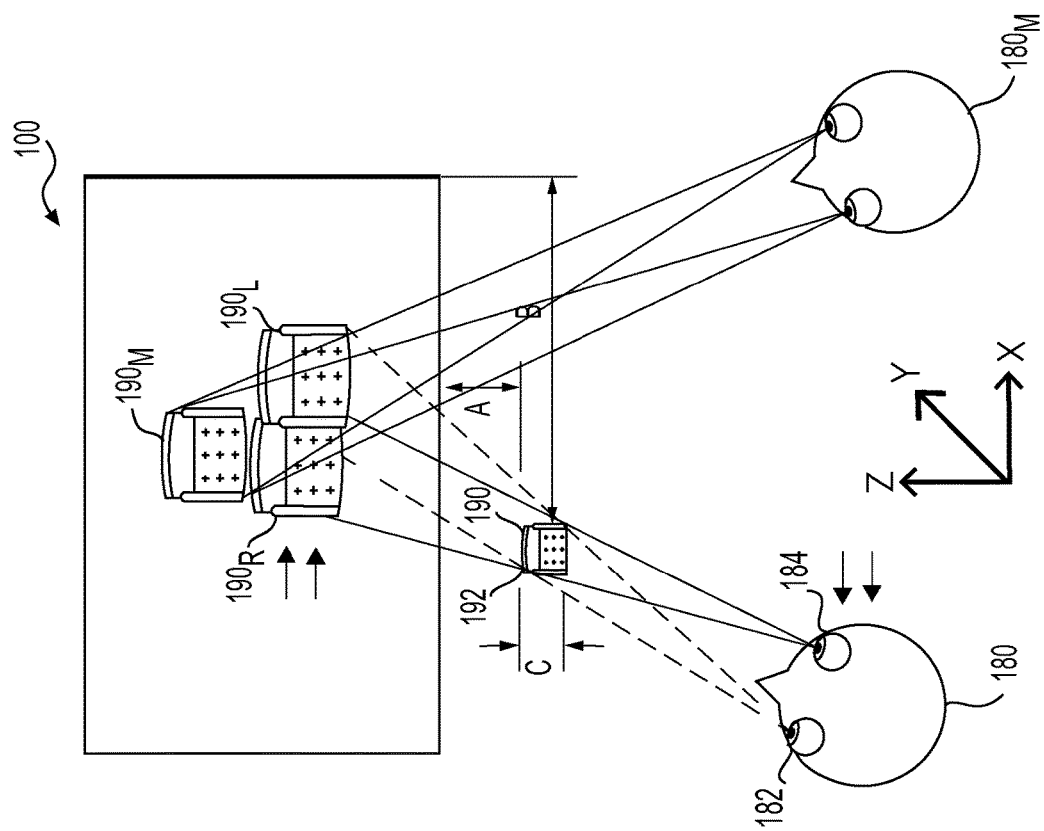
FIGS. 16a and 16b are schematic representations of a display system showing a monoscopic image of an object to a first viewer and a stereoscopic image of the object to a second viewer, also showing a perspective of the stereoscopic image as a function of varying positions of the second viewer according to an embodiment.
Figure 16B:
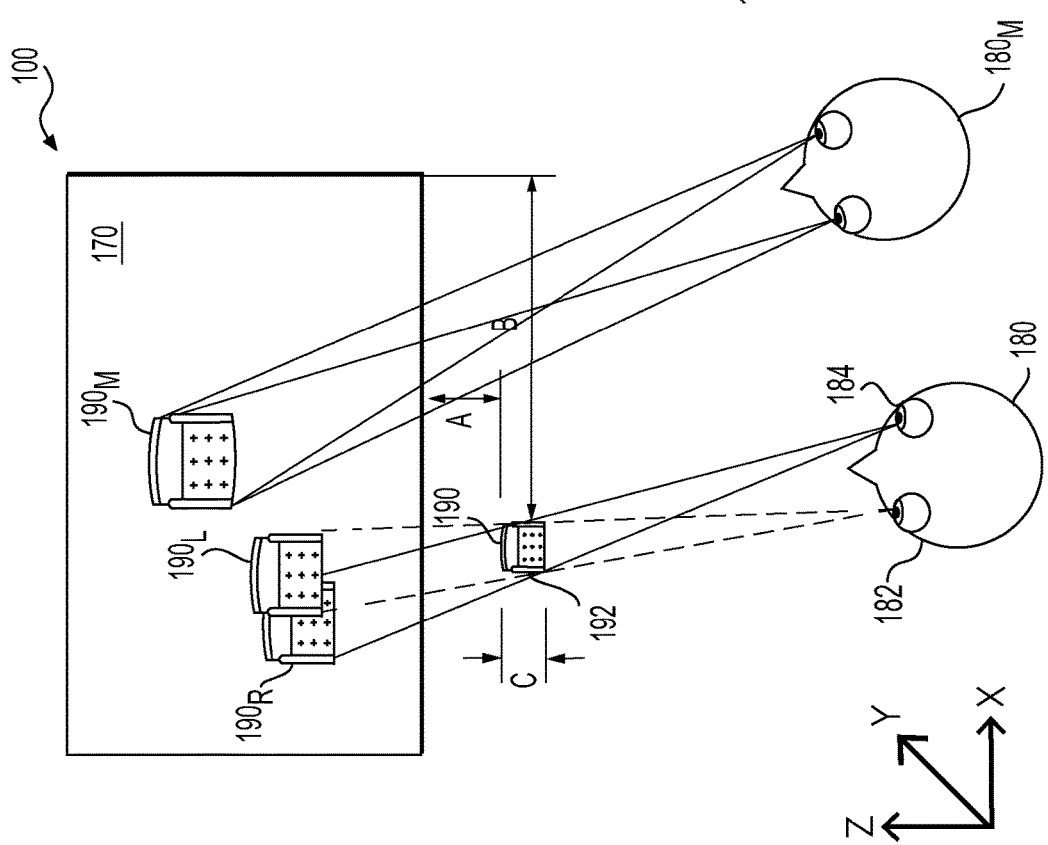

FIGS. 16a and 16b are schematic representations of a display system showing a monoscopic image of an object to a first viewer and a stereoscopic image of the object to a second viewer, also showing a perspective of the stereoscopic image as a function of varying positions of the second viewer according to an embodiment. FIGS. 16a and 16b reproduce the contents of FIGS. 4a and 4b and show the left view 190L and the right view 190R of the virtual object 190. A monoscopic (2D) view 190M of the virtual object is visible to another viewer 180M.

To this end, the tracking system 130 tracks the position of the left and right eyes 182, 184 of the viewer 180 and also tracks the position of the viewer 180M. The controller 110 uses the position information obtained from the tracking system 130 to generate the left view 190L of the virtual object 190 in a first timeslot, the right view 190R of the virtual object 190 in a second timeslot, and the monoscopic view 190M of the virtual object 190 in a third timeslot. The controller 110 also causes the light source 140 to direct light toward the left eye 182 of the viewer 180 in the first timeslot, toward the right eye 184 of the viewer 180 in the second timeslot, and toward the viewer 180M in the third timeslot.

On FIGS. 16a and 16b, the viewer 180M may comprise a plurality of viewers 180M that may be presented with the same monoscopic image or with distinct monoscopic images, depending on their position.

Figure 17A:
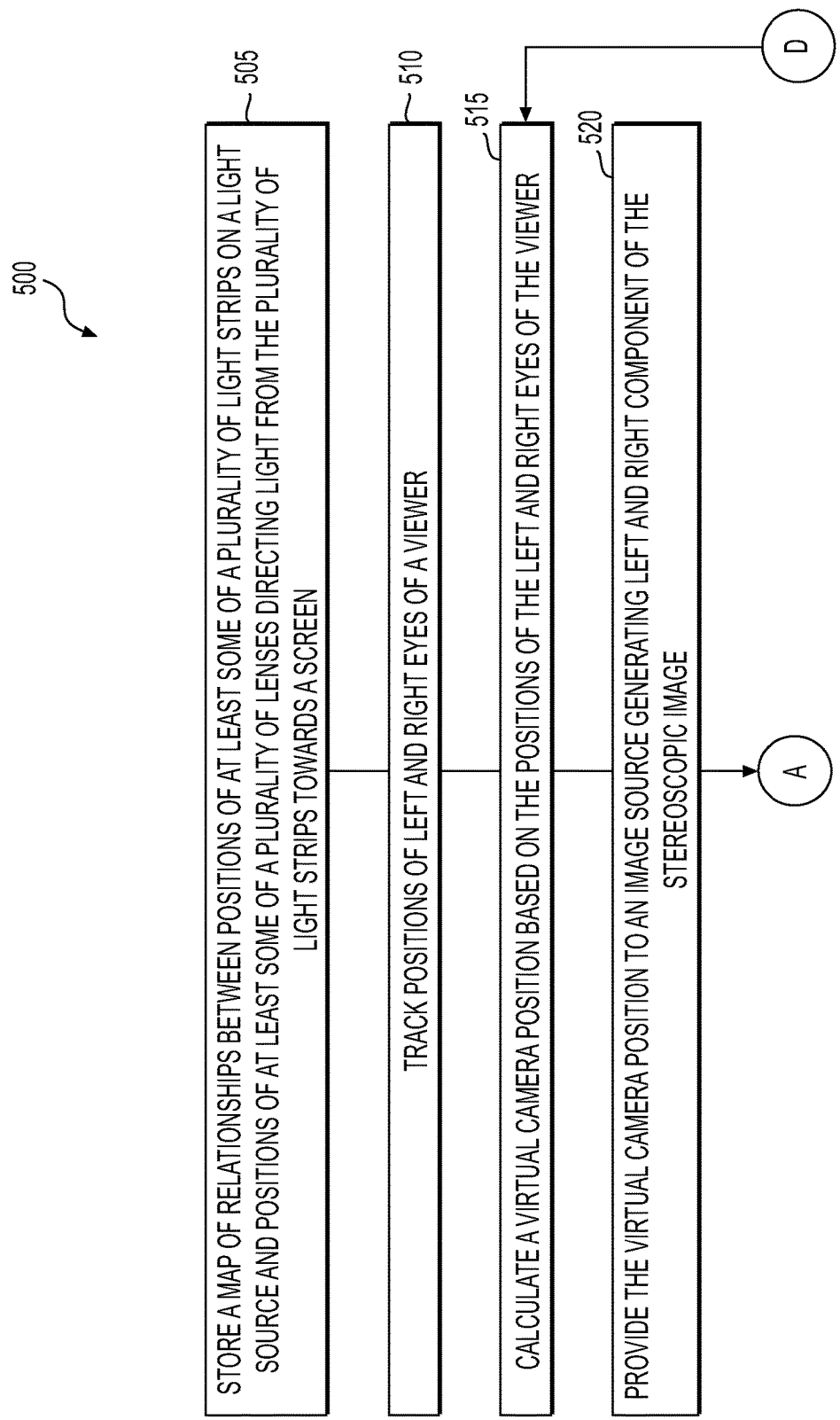
FIGS. 17a-17d show a sequence diagram showing operations of a method for showing a stereoscopic image according to an embodiment.
Figure 17B:
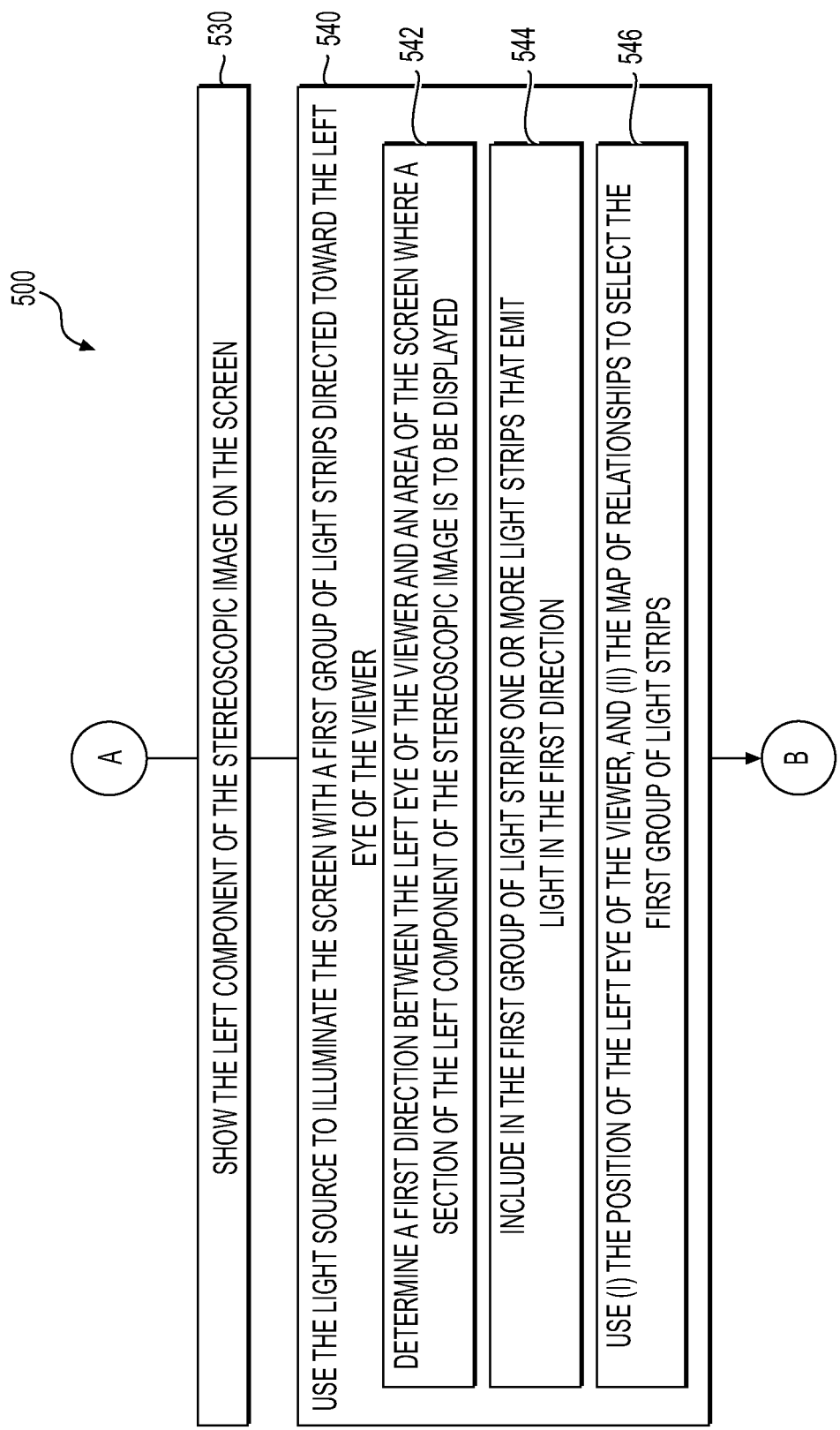
Figure 17C:
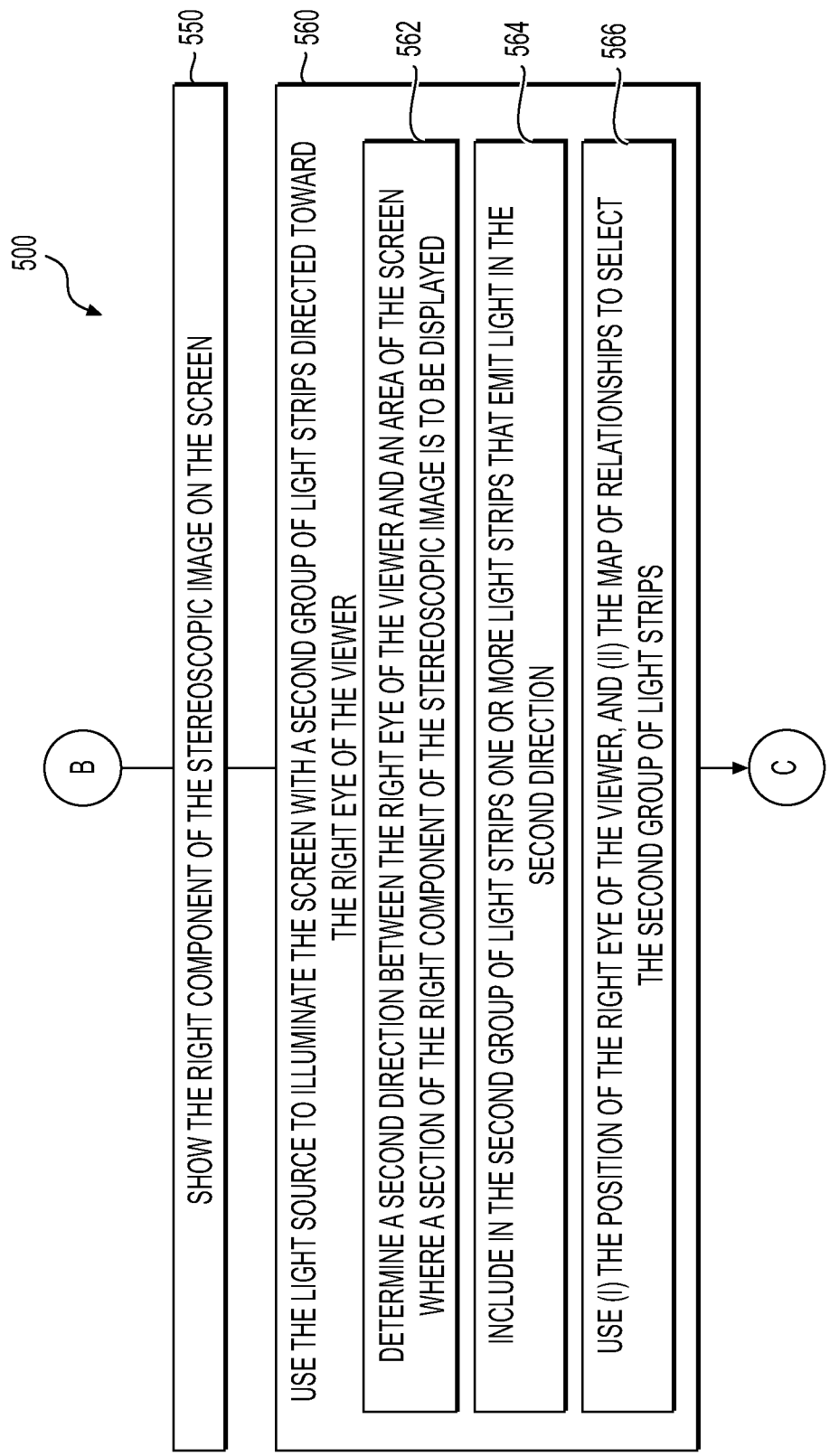
Figure 17D:
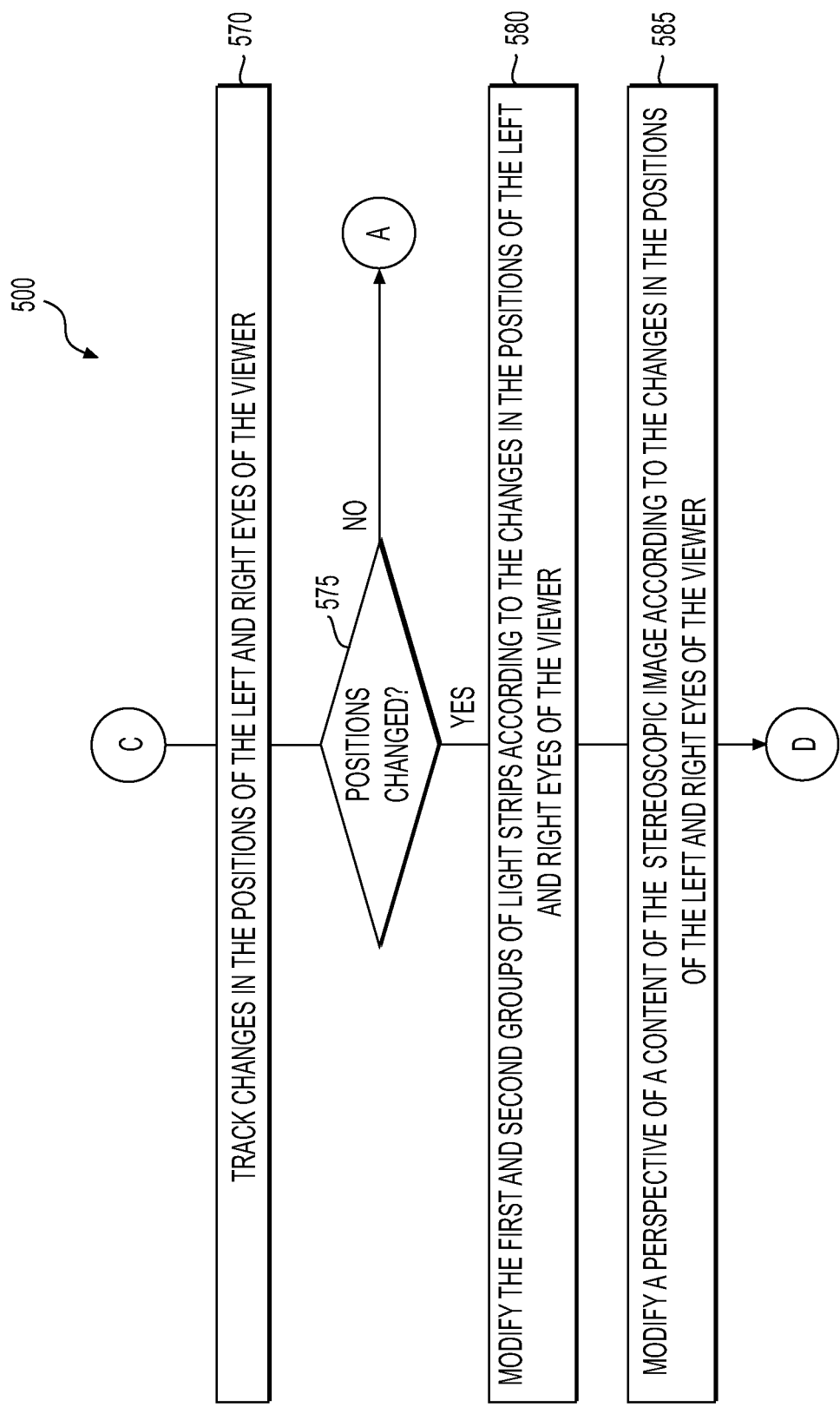

In earlier stereoscopic displays, a first viewer may perceive a 3D rendering of an object while a second viewer may perceive a 2D rendering of the same object; the 2D rendering of that object may be blurred, as when a viewer does not wear stereoscopic glasses when conventional 3D displays are used. If the first viewer moves, the 3D rendering of the object may change and cause the 2D rendering of the object to be modified, becoming more blurred or distorted, in a manner that is detrimental to the visual experience of the second viewer. In the example of FIGS. 16A and 17B, the monoscopic image 190M as seen by the viewer 180M is not impacted by movements of the viewer 180.

It will be understood that the example of FIGS. 16a and 16b may be modified by showing a monoscopic image of an object other than the virtual object 190 to the viewer 180M or by showing distinct monoscopic images to distinct viewers 180M.

FIGS. 17a-17d show a sequence diagram showing operations of a method for showing a stereoscopic image according to an embodiment. On FIGS. 17a-17d, a sequence 500 comprises a plurality of operations, some of which may be executed in variable order, some of the operations possibly being executed concurrently, some of the operations being optional. At operation 505, the controller 110 may store a map of relationships within the display system 100, 200, 300 or 400, between positions of at least some of the parallel light strips 142 on the light source 140 and positions of at least some of the lenses 152 that direct light from the parallel light strips 142 toward the screen 170. In some embodiments, the controller 110 may store all possible such relationships. In at least some embodiments, relative positions between some of the parallel light strips 142 and of the lenses 152 may be such that light emitted from certain light strips 142 and passing through certain lenses 152 could not physically reach the screen 170. For that reason, the controller 110 may be configured to only store those relationships that may practically be put to use in the display system 100, 200, 300 or 400.

Positions of the left and right eyes 182, 184 of the viewer 180 are tracked by the tracking system 130 and provided to the controller 110 at operation 510. In an embodiment, positions of the left and right eyes of the viewer 180 may be tracked by the tracking system 130. The positions of the left and right eyes 182, 184 of the viewer 180 are defined in at least two dimensions including lateral positions along a width of the screen 170 (X axis on FIG. 1) and distances between the left and right eyes 182, 184 and a visible surface of the screen 170 (Z axis on FIG. 1). The positions of the left and right eyes 182, 184 of the viewer may further be defined in a third vertical dimension along a height of the screen 170 (best seen as Y axis on FIG. 3). At operation 515, the controller 110 may calculate a virtual camera position based on the positions of the left and right eyes 182, 184 of the viewer 180, in which case the virtual camera positions may be provided, at operation 520, by the controller 110 to the image source 120 that generates the left and right components of the stereoscopic image. The stereoscopic image may be a still image or may comprise a moving video.

Following operations 505 to 520, a repeating succession of two timeslots is initiated for respectively showing left and right components of the stereoscopic image. In an embodiment, the two timeslots are executed at any frequency but preferably at least once every 20 milliseconds so that the complete stereoscopic image is refreshed at least 50, 60, 72 times per second or faster to avoid any flickering perception from the viewer. In a first timeslot, at operation 530, the left component of the stereoscopic image is shown on the screen 170. At operation 540, concurrently with operation 530, the light source 140 is used to illuminate the screen 170 with a first group of light strips 142 that are directed toward the left eye 182 of the viewer 180.

To identify the first group, operation 540 may include, for each given section on the left component of the stereoscopic image to be displayed on the screen, one or more of sub-operations 542, 544 and/or 546. At sub-operation 542, a first direction between the left eye 182 of the viewer and an area of the screen 170 where the given section on the left component is to be displayed is determined. At sub-operation 544, one or more light strips that emit light in the first direction are included in the first group of light strips 142. The controller 110 may use (i) the position of the left eye 182 of the viewer 180 and (ii) the map of relationships stored at operation 505 to select the first group of light strips 142 at sub-operation 546. In an embodiment, sub-operations 542, 544 and/or 546 may not be executed in each pass of the second timeslot if the position of the viewer 180 remains constant.

In a second timeslot, at operation 550, the right component of the stereoscopic image is shown on the screen 170. At operation 560, concurrently with operation 550, the light source 140 is used to illuminate the screen 170 with a second group of light strips 142 that are directed toward the right eye 184 of the viewer 180.

To identify the second group, operation 560 may include, for each given section on the right component of the stereoscopic image to be displayed on the screen, one or more of sub-operations 562, 564 and/or 566. At sub-operation 562, a second direction between the right eye 184 of the viewer and an area of the screen 170 where the given section on the right component is to be displayed is determined. At sub-operation 564, one or more light strips that emit light in the second direction are included in the second group of light strips 142. The controller 110 may use (i) the position of the right eye 184 of the viewer 180 and (ii) the map of relationships stored at operation 505 to select the second group of light strips 142 at sub-operation 566. In an embodiment, sub-operations 562, 564 and/or 566 may not be executed in each pass of the second timeslot if the position of the viewer 180 remains constant.

For example and without limitation, the two timeslots may be repeated at a frequency of 50 Hz, this refresh rate being sufficient for showing video images with no flickering perception for most viewers.

The controller 110 may determine that the positions of the left and right eyes 182, 184 of the viewer 180 are temporarily lost, or uncertain. This determination may for example be made when the controller 110 receives a signal from the tracking system 130 indicating a loss of tracking of the viewer 180. In such circumstances, the controller 110 may cause the image source 120 to show a monoscopic image component of the stereoscopic image on the screen 170 while causing the light source 140 to illuminate the screen 170 with all of its light strips 142. At that time, the display system 100, 200, 300 or 400 provides a two-dimensional view of the displayed images until a time when the tracking system 130 reverts to providing a definite position of the left and right eyes 182, 184 of the viewer 180. When tracking of the positions of the left and right eyes of the viewer is resumed, operations 530, 540, 550 and 560 (and their sub-operations, if applicable) are resumed as well.

The tracking system 130 may report to the controller 110 changes in the positions of the left and right eyes 182, 184 of the viewer 180 at operation 570. Although shown after operation 560 on FIG. 17d, operation 570 may occur at any time in the course of the sequence 500. In an embodiment, the controller 110 may verify, at operation 575, whether the positions of the left and right eyes 182, 184 of the viewer 180 after each execution of the first and second timeslots. Executing operation 575 at different times or at a different frequency is also contemplated.

Regardless, if the positions of the left and right eyes 182, 184 of the viewer 180 are unchanged at operation 575, the sequence 500 continues with another instance of operations 530 and 540 for the first timeslot and another instance of operations 550 and 560 for the second timeslot. If the controller 110 detects, at operation 575, that the positions of the left and right eyes 182, 184 of the viewer 180 have changed, the first and second groups of light strips 142 are modified at operation 580 according to these positional changes. Operation 580 may include some or all of the sub-operations 542, 544, 546, 562, 564 and 566. The controller 110 may also modify a perspective of a content of the stereoscopic image according to the changes in the positions of the left and right eyes 182, 184 of the viewer 180 at operation 585.

Figure 18:
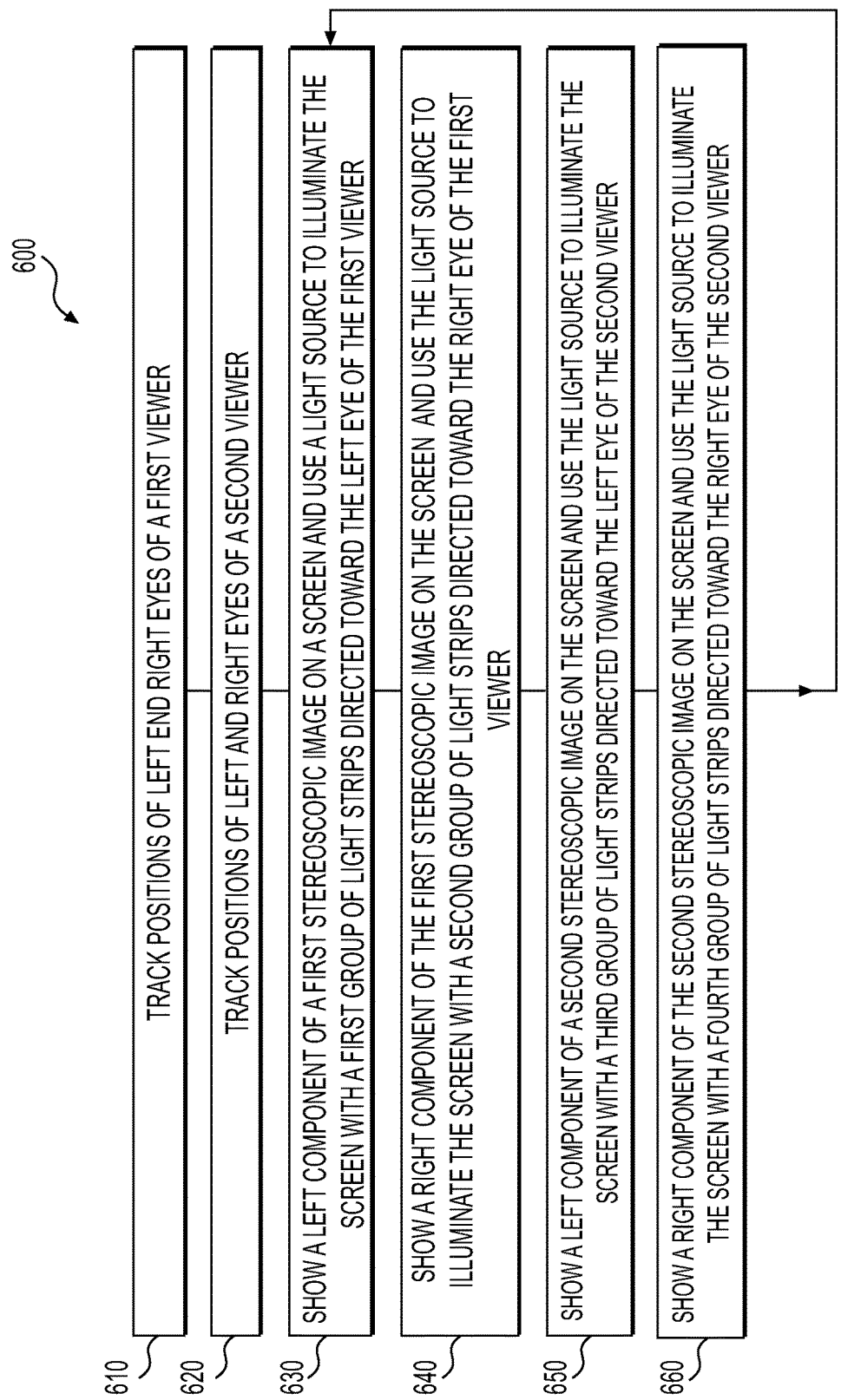
FIG. 18 is a sequence diagram showing operations of a method for showing stereoscopic images to two viewers according to an embodiment.

FIG. 18 is a sequence diagram showing operations of a method for showing stereoscopic images to two viewers according to an embodiment. On FIG. 18, a sequence 600 comprises a plurality of operations, some of which may be executed in variable order, some of the operations possibly being executed concurrently, some of the operations being optional. First and stereoscopic images may be views of a same object or of a same scene visible according to respective point of views of the first and second viewers. Alternatively, the first and second stereoscopic images may be views of different objects or views of different scenes. The sequence 600 is similar to the sequence 500, with the exception that four distinct timeslots are used for showing left and right image components to two distinct viewers according to their respective positions.

Positions of the left and right eyes of a first viewer are tracked by the tracking system 130 and provided to the controller 110 at operation 610 and positions of the left and right eyes of a second viewer are tracked by the tracking system 130 and provided to the controller 110 at operation 620.

In a first timeslot at operation 630, a left component of the first stereoscopic image is shown on the screen 170 and, concurrently, the light source 140 illuminates the screen 170 with a first group of light strips 142 directed toward the left eye of the first viewer. In a second timeslot at operation 640, a right component of the first stereoscopic image is shown on the screen 170 and, concurrently, the light source 140 illuminates the screen 170 with a second group of light strips 142 directed toward the right eye of the first viewer.

In a third timeslot at operation 650, a left component of the second stereoscopic image is shown on the screen 170 and, concurrently, the light source 140 illuminates the screen 170 with a third group of light strips 142 directed toward the left eye of the second viewer. In a fourth timeslot at operation 660, a right component of the second stereoscopic image is shown on the screen 170 and, concurrently, the light source 140 illuminates the screen 170 with a fourth group of light strips 142 directed toward the right eye of the second viewer.

Operation 630 for the first timeslot follows operation 660 for the fourth timeslot. The first, second, third and fourth timeslots occur in succession without overlap in the repeating succession of timeslots.

In an embodiment, the order of the timeslots may be modified so that, for example, left components of the first and second stereoscopic images are shown for the first and second viewers, followed by a showing of the right components of the first and second stereoscopic images for the first and second viewers. Other embodiments may use different orders of the timeslots and the present disclosure includes any possible order of the various timeslots.

Although not shown on FIG. 18, the sequence 600 may include operation 505 for storing the map of relationships within the display system 100, 200, 300 or 400. The sequence 600 may also include one or more of operations 515, 520, 570, 575, 580 and 585, or their equivalents, as well as sub-operations 542, 544, 546 within operations 640 and 650, and sub-operations 562, 564 and 566 within operations 640 and 660, or equivalents of these sub-operations, these operations and sub-operations being executed independently for each of the two viewers.

The sequence 600 may be extended to allow showing stereoscopic images to a plurality of distinct viewers. The tracking system 130, or a plurality of tracking systems 130, track positions each viewer. The controller 110 defines a repeating succession of non-overlapping first timeslots and second timeslots. One specific first timeslot and one specific second timeslot is allocated to and reserved for each given viewer. For a given viewer, left and right components of a specific stereoscopic image are displayed on the screen 170 in the specific first and second timeslots for that given viewer in the same manner as described hereinabove.

Figure 19:
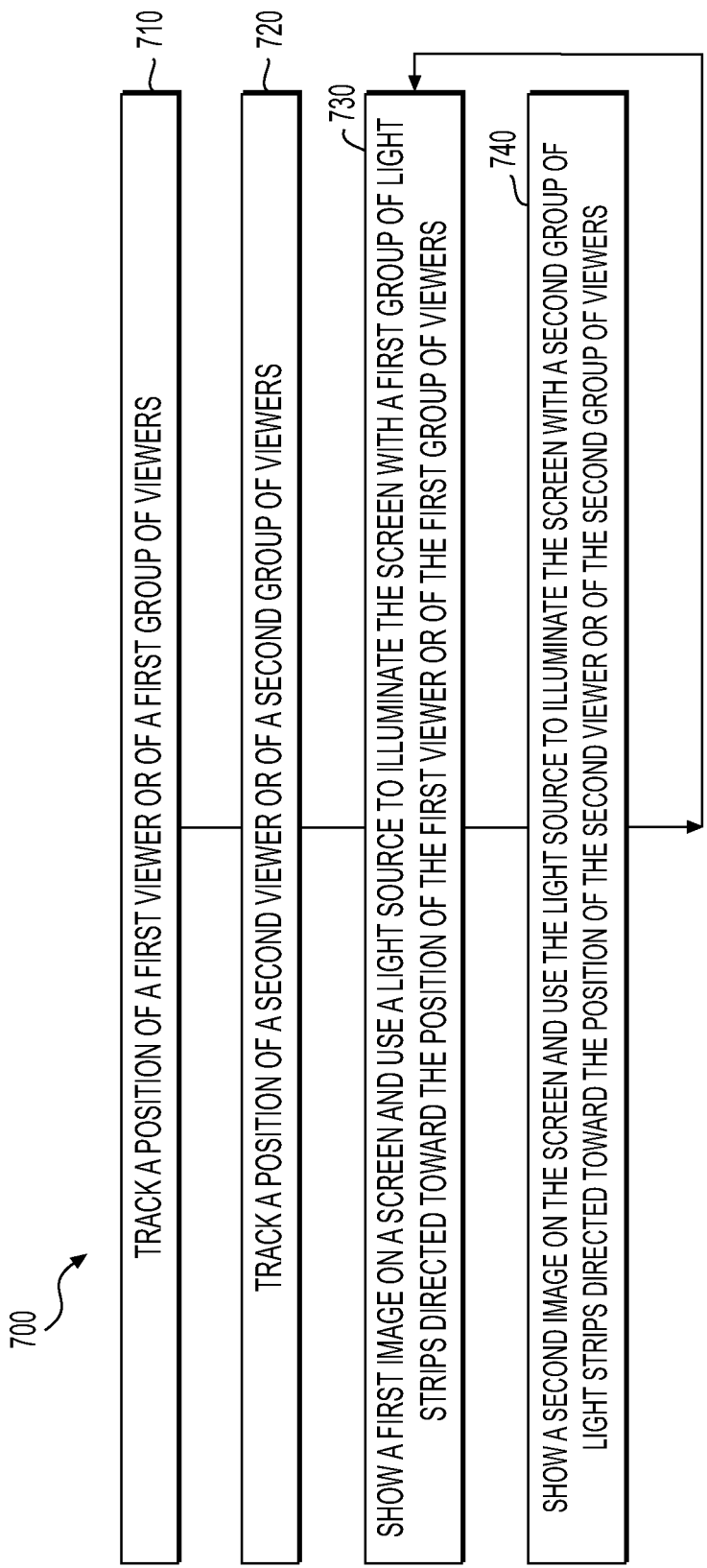
FIG. 19 is a sequence diagram showing operations of a method for concurrently showing different images to at least two viewers according to an embodiment.

FIG. 19 is a sequence diagram showing operations of a method for concurrently showing different images to at least two viewers according to an embodiment. On FIG. 19, a sequence 700 comprises a plurality of operations, some of which may be executed in variable order, some of the operations possibly being executed concurrently, some of the operations being optional.

A position of a first viewer or of a first group of viewers is tracked at operation 710. At operation 720, a position of a second viewer or of a second group of viewers is also tracked. Operations 730 and 740 are successively executed in a repeating succession of timeslots. In a first timeslot at operation 730, a first image is shown on the screen 170 and the light source 140 is used to illuminate the screen 170 with a first group of light strips 142 directed toward the position of the first viewer or of the first group of users. In a second timeslot at operation 740, a second image is shown on the screen 170 and the light source 140 is used to illuminate the screen 170 with a second group of light strips 142 directed toward the position of the second viewer or of the second group of users.

The sequence 700 may be extended by tracking positions of one or more users or tracking positions of one or more additional groups of users and by defining one or more additional timeslots in the succession of timeslots. The controller 110 may, in the one or more additional timeslots, cause the showing on the screen 170 of one or more additional images and cause the light source 140 to illuminate the screen 170 with one or more additional groups of light strips 172 directed toward the one or more additional viewers or toward the one or more additional groups of users. A corresponding number of images and of timeslots may thus be defined by a corresponding number of users or of groups of users.

Figure 20:
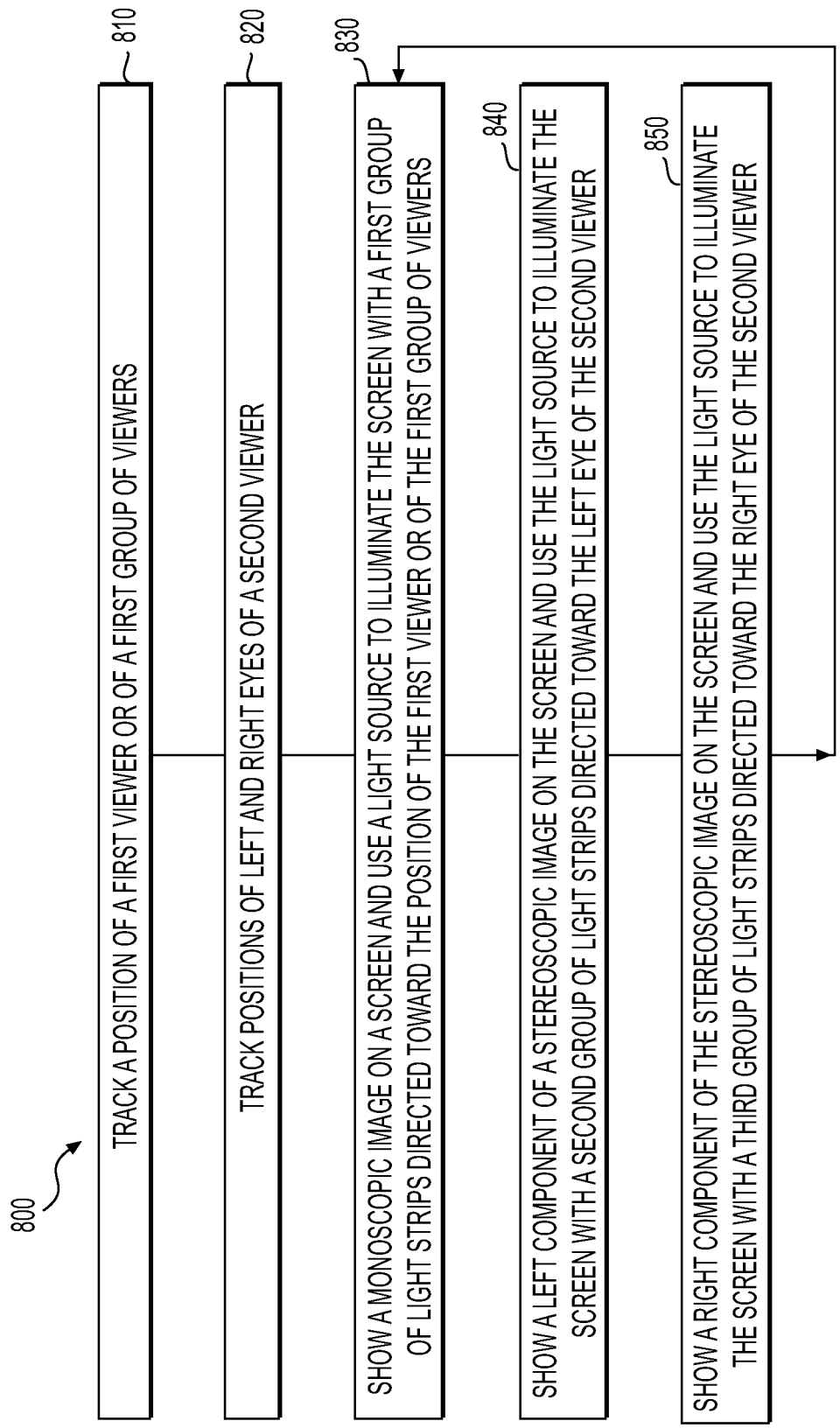
FIG. 20 is a sequence diagram showing operations of a method for concurrently showing a monoscopic image and a stereoscopic image according to an embodiment.

FIG. 20 is a sequence diagram showing operations of a method for concurrently showing a monoscopic image and a stereoscopic image according to an embodiment. On FIG. 20, a sequence 800 comprises a plurality of operations, some of which may be executed in variable order, some of the operations possibly being executed concurrently, some of the operations being optional.

A position of a first viewer or of a first group of viewers is tracked at operation 810. Positions of left and right eyes of a second viewer are tracked at operation 820. Operations 830, 840 and 850 are successively executed in a repeating succession of timeslots. In a first timeslot at operation 830, a monoscopic image on the screen 170 and the light source 140 is used to illuminate the screen 170 with a first group of light strips 142 directed toward the position of the first viewer or of the first group of users. In a second timeslot at operation 840, a left component of a stereoscopic image is shown on the screen 170 and the light source 140 is used to illuminate the screen 170 with a second group of light strips 142 directed toward the position of the left eye of the second viewer. In a third timeslot at operation 850, a right component of the stereoscopic image is shown on the screen 170 and the light source 140 is used to illuminate the screen 170 with a third group of light strips 142 directed toward the position of the right eye of the second viewer.

As in the case of the sequence 700, the sequence 800 may be extended by tracking positions of one or more users or tracking positions of one or more additional groups of users and by defining one or more additional timeslots in the succession of timeslots for showing additional monoscopic and/or stereoscopic images.

In both sequences 700 and 800, as in the previous sequences 500 and 600, other embodiments may use different orders of the timeslots and the present disclosure includes any possible order of the various timeslots. The sequences 700 and 800 are simplified for ease of illustration, as they may incorporate various operations of the sequence 500, including for example one or more of operations 505, 515, 520, 570, 575, 580, and 585 or their equivalents, and/or one or more of sub-operations 542, 544, 546, 562, 564, and 566, or their equivalents.

Figure 21:
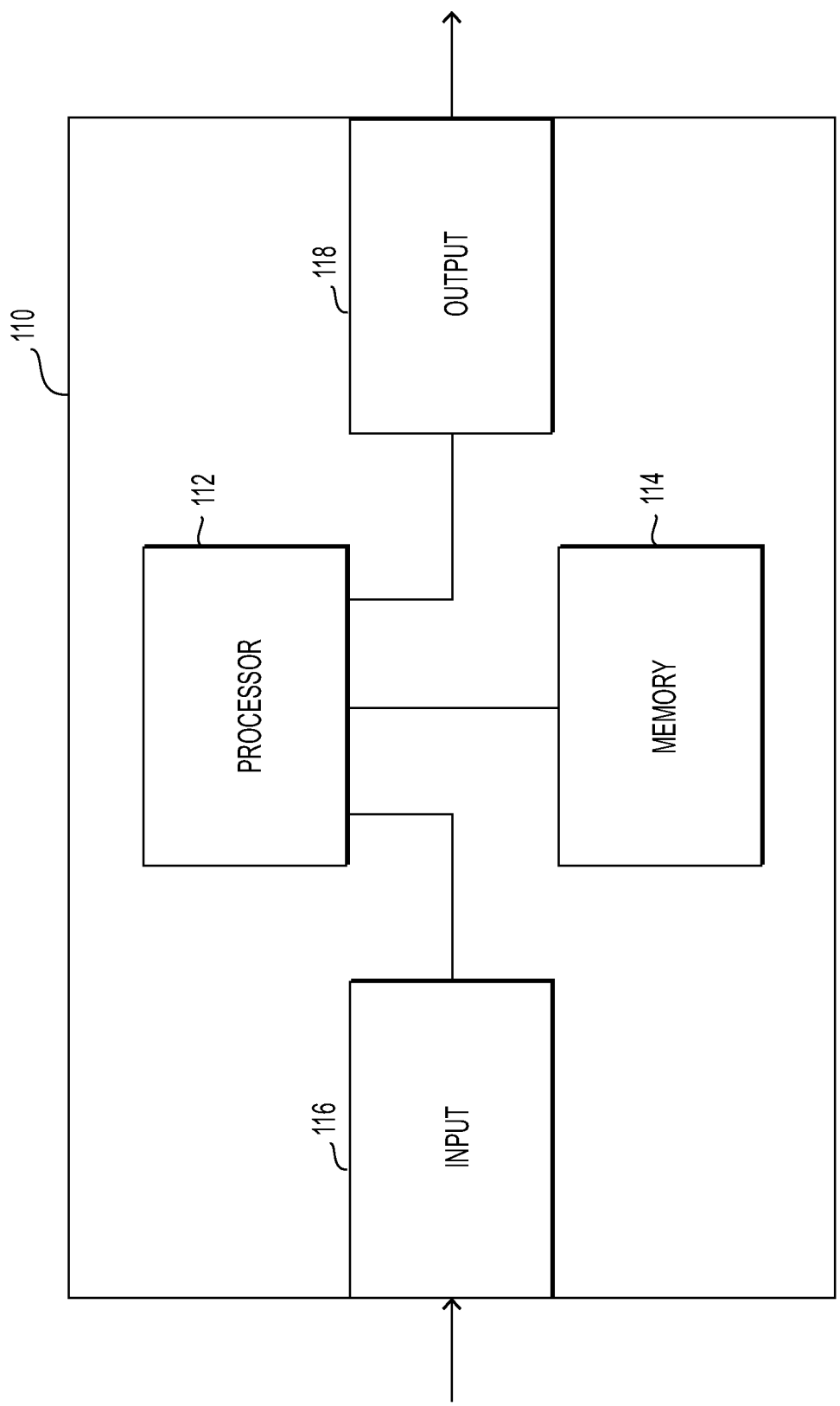
FIG. 21 is a block diagram of a controller of the display system according to an embodiment.

The operations of the sequences 500, 600, 700 and 800 may be configured to be processed by one or more processors, the one or more processors being coupled to a memory. For example, FIG. 21 is a block diagram of a controller of the display system according to an embodiment. The controller 110 includes a processor 112 or a plurality of co-operating processors (only one processor 112 is shown for simplicity), a memory device 114 or a plurality of memory devices (only one memory device 114 is shown for simplicity), an input device 116 and an output device 118. The input device 116 and the output device 118 may be combined in a single input/output device. The input device 116 and the output device 118 are connectable to the tracking system 130, the image source 120 and the light source 140. The memory device 114, the input device 116 and the output device 118 are all operatively connected to the processor 112. The memory device 114 may comprise a non-transitory storage medium storing instructions for execution by the processor 112.

The processor 112 may for example receive a position of the viewer 180 from the tracking system 130, via the input device 116 and calculate positions of left and right eyes 182, 184 of the viewer 180 based on the position of the viewer 180. Alternatively, the processor 112 may receive the positions of the left and right eyes 182, 184 of the viewer 180 from the tracking system 130, via the input device 116. Regardless, in a first timeslot of a repeating succession of timeslots, the processor 112 sends control information via the output device 118 to (i) cause the image source 120 to generate the left component of the stereoscopic image, and (ii) control lighting of the first group of light strips 142. Then in a second timeslot of the repeating succession of timeslots, the processor 112 sends control information via the output device 118 to (i) cause the image source 120 to generate the right component of the stereoscopic image, and (ii) control lighting of a second group of light strips 142.

The processor 112 may further be configured to execute instructions stored in the memory device 114 to perform other operations of the control device 110 as described in the sequences 500, 600, 700 and 800.

Those of ordinary skill in the art will realize that the description of the method and the display system for showing a stereoscopic image are illustrative only and are not intended to be in any way limiting. Other embodiments will readily suggest themselves to such persons with ordinary skill in the art having the benefit of the present disclosure. Furthermore, the disclosed method and display system may be customized to offer valuable solutions to existing needs and problems related to showing 3D images. In the interest of clarity, not all of the routine features of the implementations of the method and display system are shown and described. In particular, combinations of features are not limited to those presented in the foregoing description as combinations of elements listed in the appended claims form an integral part of the present disclosure. It will, of course, be appreciated that in the development of any such actual implementation of the method and display system, numerous implementation-specific decisions may need to be made in order to achieve the developer's specific goals, such as compliance with application-related, system-related, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of electronic video equipment having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as a digital signal processor (DSP), hardwired devices, field programmable gate arrays (FPGAs), application specific integrated circuits (ASICs), or the like, may also be used. Where a method comprising a series of operations is implemented by a computer, a processor operatively connected to a memory, or a machine, those operations may be stored as a series of instructions readable by the machine, processor or computer, and may be stored on a non-transitory, tangible medium.

Systems and modules described herein may comprise software, firmware, hardware, or any combination(s) of software, firmware, or hardware suitable for the purposes described herein. Software and other modules may be executed by a processor and reside on a memory of servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A display system for showing a stereoscopic image, comprising:
    an image source adapted to generate left and right components of the stereoscopic image;
    a screen operatively connected to the image source and adapted to display the left and right components of the stereoscopic image;
    a light source adapted to selectively emit a plurality of parallel light strips;
    a lenticular panel having a plurality of parallel lenses, each given lens of the lenticular panel being configured to direct light from a given light strip of the light source toward the screen in a direction determined by relative positions of the given light strip and of the given lens;
    a directional diffuser positioned in a path of the light between the lenticular panel and the screen, an axial rotation of the directional diffuser in relation to the lenticular panel allowing to hide at least in part a pattern of the lenses of the lenticular panel;
    a tracking system adapted to track a position of a viewer; and
    a controller operatively connected to the image source, to the light source, and to the tracking system, the controller being configured to:
        receive at least one of:
            the position of the viewer from the tracking system, the controller being configured to further calculate positions of left and right eyes of the viewer based on the position of the viewer, and
            the positions of the left and right eyes of the viewer from the tracking system,
        in a first timeslot of a repeating succession of timeslots, (i) cause the image source to generate the left component of the stereoscopic image, and (ii) cause lighting of a selected first group of light strips directed by the lenticular panel through the screen and toward the left eye of the viewer for showing pixels of the left component of the stereoscopic image, selection of the first group of light strips being based on the at least one of the position of the viewer and the positions of the left and right eyes, and
        in a second timeslot of the repeating succession of timeslots, (i) cause the image source to generate the right component of the stereoscopic image, and (ii) cause lighting of a selected second group of light strips directed by the lenticular panel through the screen and toward the right eye of the viewer for showing pixels of the right component of the stereoscopic image, selection of the second group of light strips being based on the at least one of the position of the viewer and the positions of the left and right eyes.

2. The display system of claim 1, wherein:
    the tracking system is further adapted to track positions of left and right eyes of the viewer, and
    the controller is further configured to:
        receive the positions of the left and right eyes of the viewer from the tracking system,
        control lighting of the first group of light strips to direct light toward the left eye of the viewer, and
        control lighting of the second group of light strips to direct light toward the right eye of the viewer.

3. The display system of claim 1, wherein the controller is further configured to:
    for each given section on the left component of the stereoscopic image to be displayed on the screen:
        determine a first direction between the left eye of the viewer and an area of the screen where the given section on the left component is to be displayed, and
        include in the first group of light strips one or more light strips that emit light in the first direction; and
    for each given section on the right component of the stereoscopic image to be displayed on the screen:
        determine a second direction between the right eye of the viewer and an area of the screen where the given section on the right component is to be displayed, and
        include in the second group of light strips one or more light strips that emit light in the second direction.

4. The display system of claim 3, wherein the controller is further configured to determine a direction of light emitted by each given light strip of the light source in view of a directional effect of each given lens of the lenticular panel directing light from the given light strip.

5. The display system of claim 1, wherein:
the controller includes a memory adapted to store a map of relationships between positions of at least some of the light strips on the light source and positions of at least some of the lenses of the lenticular panel; and
the controller is configured to use (i) the positions of the left and right eyes of the viewer, and (ii) the map of relationships stored in the memory to select the first and second groups of light strips.

6. The display system of claim 1, wherein the light source comprises:
a uniform light source; and
a controllable pixel matrix adapted to selectively pass or block light from the uniform light source to form the light strips.

7. The display system of claim 6, wherein the controllable pixel matrix comprises a liquid crystal display (LCD) panel.

8. The display system of claim 7, where the lenticular panel is axially rotated in relation to the LCD panel.

9. The display system of claim 1, wherein the light source is addressable and controllable by the controller.

10. The display system of claim 1, wherein the light source is selected from an organic light-emitting diode (OLED) panel, a micro light emitting diode (micro-LED) panel, and a combination formed of a plurality of small light sources.

11. The display system of claim 1, wherein the image source comprises a three-dimensional (3D) rendering device.

12. The display system of claim 11, wherein the controller is further configured:
to calculate virtual camera positions based on the positions of the left and right eyes of the viewer; and
provide the virtual camera positions to the 3D rendering device.

13. The display system of claim 1, wherein the lenses of the lenticular panel are selected from plano-convex lenses, convex-plano lenses, aspherical lenses, concave-convex lenses and a combination thereof.

14. The display system of claim 1, further comprising a blackout strip positioned between each pair of the lenses of the lenticular panel.

15. The display system of claim 1, wherein the directional diffuser is selected from a lenticular panel, a panel including a plurality of lenses having a pseudo random focal length distribution, a panel including a plurality of lenses having a pseudo random width distribution, and a prism array panel including a plurality of prisms having a pseudo random angle and width distribution.

16. The display system of claim 15, wherein the light source generates vertically collimated light, the display system further comprising:
a first directional diffuser and a second directional diffuser positioned in a path of the vertically collimated light between the lenticular panel and the screen, the first directional diffuser being axially rotated in relation to the lenticular panel to mix the vertically collimated light, the second directional diffuser being axially rotated in relation to the lenticular panel to hide at least in part a pattern of the lenses of the lenticular panel.

17. The display system of claim 1, wherein:
the light strips of the light source and the lenses of the lenticular panel extend vertically;
the light source is formed of a first plurality of horizontal segments; and
the lenticular panel is formed of a second plurality of horizontal segments corresponding to the first plurality of segments of the light source.

18. A display system for showing images to at least two viewers, comprising:
an image source adapted to generate a first image for a first viewer or a first group of viewers and a second image for a second viewer or a second group of viewers;
a screen operatively connected to the image source and adapted to display the first and second images;
a light source adapted to selectively emit a plurality of parallel light strips;
a lenticular panel having a plurality of parallel lenses, each given lens of the lenticular panel being configured to direct light from a given light strip of the light source toward the screen in a direction determined by relative positions of the given light strip and of the given lens;
a directional diffuser positioned in a path of the light between the lenticular panel and the screen, an axial rotation of the directional diffuser in relation to the lenticular panel allowing to hide at least in part a pattern of the lenses of the lenticular panel;
a tracking system adapted to track a position of the first viewer or a position of the first group of viewers and to track a position of the second viewer or a position of the second group of viewers; and
a controller operatively connected to the image source, to the light source, and to the tracking system, the controller being configured to:
receive the position of the first viewer or the position of the first group of viewers from the tracking system,
in a first timeslot of a repeating succession of timeslots, (i) cause the image source to generate the first image, and (ii) control lighting of a first group of light strips directed by the lenticular panel through the screen and toward the position of the first viewer or toward the position of the first group of viewers for showing pixels of the first image to the first viewer or to the first group of viewers,
receive the position of the second viewer or the position of the second group of viewers from the tracking system, and
in a second timeslot of the repeating succession of timeslots, (i) cause the image source to generate the second image, and (ii) control lighting of a second group of light strips directed by the lenticular panel through the screen and toward the position of the second viewer or toward the position of the second group of viewers for showing pixels of the second image to the second viewer or to the second group of viewers.

19. The display system of claim 18, wherein the image source comprises a first image source adapted to generate the first image and a second image source adapted to generate the second image.

20. The display system of claim 18, wherein the tracking system comprises a first tracking system adapted to track the position of the first viewer or the position of the first group of viewers and a second tracking system adapted to track the position of the second viewer or the position of the second group of viewers.

21. The display system of claim 18, wherein:
the image source is adapted to generate a plurality of images for a plurality of viewers;
the tracking system is adapted to track positions of each of the plurality of viewers; and the controller is further configured to:
receive the positions of each of the plurality of viewers,
define a plurality of timeslots, one timeslot being defined for each of the plurality of viewers, and
in a given timeslot, cause the image source to generate an image for a given one of the plurality of viewers, and (ii) control lighting of a given group of light strips directed by the lenticular panel through the screen and toward a position of the given viewer.

22. A display system for showing images to at least two viewers, comprising:
an image source adapted to generate a monoscopic image for a first viewer or a first group of viewers and to generate a stereoscopic image for a second viewer;
a screen operatively connected to the first and second image sources and adapted to display the monoscopic image and the stereoscopic image;
a light source adapted to selectively emit a plurality of parallel light strips;
a lenticular panel having a plurality of parallel lenses, each given lens of the lenticular panel being configured to direct light from a given light strip of the light source toward the screen in a direction determined by relative positions of the given light strip and of the given lens;
a directional diffuser positioned in a path of the light between the lenticular panel and the screen, an axial rotation of the directional diffuser in relation to the lenticular panel allowing to hide at least in part a pattern of the lenses of the lenticular panel;
a tracking system adapted to track a position of the first viewer or a position of the first group of viewers and to track positions of left and right eyes of the second viewer; and
a controller operatively connected to the image source, to the light source, and to the tracking system, the controller being configured to:
receive the position of the first viewer or the position of the first group of viewers from the tracking system,
in a first timeslot of a repeating succession of timeslots, (i) cause the image source to generate the monoscopic image, and (ii) control lighting of a first group of light strips directed by the lenticular panel through the screen and toward the position of the first viewer or toward the position of the first group of viewers for showing pixels of the monoscopic image to the first viewer or to the first group of viewers,
receive the positions of the left and right eyes of the second viewer from the tracking system,
in a second timeslot of the repeating succession of timeslots, (i) cause the image source to generate a left component of the stereoscopic second image, and (ii) control lighting of a second group of light strips directed by the lenticular panel through the screen and toward the position of the left eye of the second viewer for showing pixels of the left component of the stereoscopic image to the second viewer, and
in a third timeslot of the repeating succession of timeslots, (i) cause the image source to generate a right component of the stereoscopic second image, and (ii) control lighting of a second group of light strips directed by the lenticular panel through the screen and toward the position of the right eye of the second viewer for showing pixels of the right component of the stereoscopic image to the second viewer.

23. The display system of claim 22, wherein the image source comprises a first image source adapted to generate the monoscopic image and a second image source adapted to generate the stereoscopic image.

24. The display system of claim 22, wherein the tracking system comprises a first tracking system adapted to track the position of the first viewer or the position of the first group of viewers and a second tracking system adapted to track the positions of the left and right eyes of the second viewer.

* * * * *